US011159590B1

(12) United States Patent
Sexauer

(10) Patent No.: US 11,159,590 B1
(45) Date of Patent: Oct. 26, 2021

(54) CONTENT RECOGNITION WHILE SCREEN SHARING

(71) Applicant: Microsoft Technology Licensing, LLC

(72) Inventor: Eric Randall Sexauer, Woodenville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/846,252

(22) Filed: Apr. 10, 2020

(51) Int. Cl.
| | | |
|---|---|---|
| *G06F 16/176* | (2019.01) | |
| *H04L 29/06* | (2006.01) | |
| *H04N 7/15* | (2006.01) | |
| *H04L 12/18* | (2006.01) | |
| *H04N 21/20* | (2011.01) | |

(52) U.S. Cl.
CPC ......... *H04L 65/403* (2013.01); *G06F 16/176* (2019.01); *H04L 12/1822* (2013.01); *H04L 12/1827* (2013.01); *H04L 65/1069* (2013.01); *H04N 7/15* (2013.01); *H04N 21/20* (2013.01)

(58) Field of Classification Search
CPC ............. H04L 12/1822; H04L 12/1827; H04L 65/1069; H04L 65/403; H04L 65/1089; H04L 51/10; H04L 67/10; H04L 67/18; H04L 67/22; H04N 7/15; H04N 21/20; G06F 16/176; G06F 16/90324; G06F 40/103; G06F 40/134; G06F 9/451; G06Q 10/101; G06T 11/00; G06T 11/203
See application file for complete search history.

(56) References Cited

U.S. PATENT DOCUMENTS

| | | |
|---|---|---|
| 9,342,814 B2 | 5/2016 | Lieb et al. |
| 9,871,832 B1 | 1/2018 | Jones et al. |
| 9,953,301 B2 | 4/2018 | Rohra et al. |
| 10,244,369 B1 | 3/2019 | Sharifi et al. |

(Continued)

OTHER PUBLICATIONS

"Screen Share Tools for Collaborative online Meetings", Retrieved from: https://www.ringcentral.com/online-meetings/screen-share.html, Jan. 3, 2019, 9 Pages.

(Continued)

*Primary Examiner* — Le H Luu
(74) *Attorney, Agent, or Firm* — NovoTechIP International PLLC

(57) ABSTRACT

Techniques performed by a data processing system for conducting a communication session between a plurality of computing devices of a plurality of participants herein include establishing a communication session between a plurality of computing devices of a plurality of participants in which media content associated with the communication session is provided to each of the computing devices of the plurality of participants, receiving, via a network connection, a first media stream from the computing device of a first participant that includes a rendering of a first content item to be shared with the plurality of participants, performing image analysis on pixel data of the first media steam to identify features of the first content item, identifying a first file associated with the first content item based on the features of the first content item, and providing access to the participants to the first file associated with the first content item.

20 Claims, 23 Drawing Sheets

(56) References Cited

U.S. PATENT DOCUMENTS

| | | | |
|---|---|---|---|
| 2010/0131584 A1* | 5/2010 | Johnson | H04L 67/18 |
| | | | 709/203 |
| 2014/0253743 A1* | 9/2014 | Loxam | G06T 11/00 |
| | | | 348/207.1 |
| 2015/0033149 A1 | 1/2015 | Kuchoor | |
| 2016/0285928 A1 | 9/2016 | Sanso et al. | |
| 2017/0046315 A1* | 2/2017 | Chitta | G06F 40/134 |
| 2017/0262159 A1 | 9/2017 | Denoue et al. | |
| 2018/0302478 A1* | 10/2018 | Clediere | G06F 9/451 |
| 2019/0052701 A1* | 2/2019 | Rathod | H04L 67/22 |
| 2019/0073640 A1 | 3/2019 | Udezue et al. | |
| 2019/0082142 A1* | 3/2019 | Pell | H04L 65/1089 |
| 2019/0124169 A1* | 4/2019 | Sundin | G06Q 10/101 |
| 2019/0199769 A1* | 6/2019 | Ramakrishnan | G06F 16/90324 |
| 2020/0097524 A1* | 3/2020 | Rimmer | G06F 40/103 |
| 2020/0177538 A1* | 6/2020 | Lewis | H04L 51/10 |
| 2020/0393909 A1* | 12/2020 | Parland | G06T 11/203 |
| 2021/0035111 A1* | 2/2021 | Jain | H04L 67/10 |

OTHER PUBLICATIONS

"Share Content During an Adobe Connect Meeting", Retrieved from: https://helpx.adobe.com/in/adobe-connect/using/sharing-content-meeting.html. Retrieved Date: Oct. 22, 2019, 46 Pages.

"International Search Report and Written Opinion Issued in PCT Application No. PCT/US21/018430", dated May 25, 2021, 10 Pages.

* cited by examiner

Monthly Planning Meeting

March 2020 Monthly Planning Meeting — 115

Project X

- Stakeholders
- Functional Requirements
- Development and Testing
- Deployment Schedule

Transcript: Let's discuss the functional requirement for Project X, which we hope to begin work on this project in Q2 of this year with the software being deployed for use by a first set of clients by Q4.

Meeting Summary — 120

Transcript — 125

Thank you all for participating in the planning meeting for this month. We have a lot of project milestones that we would like to try to meet this month...

Content — 130  170 — Upload

Meeting Recording

March 2020 Planning Meeting Slides   175 — Upload

Files — 135

2020 Yearly Project Goals Slides

Project X Whitepaper

Monthly Planning Meeting — 115

Transcript of Monthly Planning Meeting March 3, 2020

Let's discuss the functional requirement for Project X, which we hope to begin work on this project in Q2 of this year with the software being deployed for use by a first set of clients by Q4.

Slide from March 2020 Planning Meeting Slides.ppt

March 2020 Monthly Planning Meeting

Project X

- Stakeholders
- Functional Requirements
- Development and Testing
- Deployment Schedule

---

Meeting Summary — 120

Transcript — 125

Thank you all for participating in the planning meeting for this month. We have a lot of project milestones that we would like to try to meet this month...

Content — 130

| Meeting Recording ▶ | Upload — 170 |

| March 2020 Planning Meeting Slides |

Files — 135

| | Upload — 175 |

| 2020 Yearly Project Goals Slides |

| Project X Whitepaper |

Monthly Planning Meeting

Meeting Information

Required: Anne Smith;
Optional: Paul Greene
Wednesday, March 4,

Description

Montly planning meet
project goals.

Meeting Summary

Transcript

Upload Related Content — 145

Before you go, we identified the following content that may be related to the topic of the meeting. Would you like to upload this content?

☑ 2020 Yearly Project Goal Slides
☑ Project X White Paper

You may uncheck the checkbox by any items that you do not wish to upload.

[ Upload Content ]    [ Cancel ]

planning meeting for this
stones that we would ike

[ Upload ] — 170 des

[ Upload ] — 175

*No files attached at this time.*

Monthly Planning Meeting

Meeting Information

Required: Anne Smith,
Optional: Paul Greene
Wednesday, March 4,

Description

Montly planning meet
project goals.

Meeting Summary — 150

Transcript

Upload Shared Content

Before you go, we noticed that you shared content items during the meeting. Please consider uploading the shared content items so that they will be available to all of the participants of the meeting.

Please click the Select Content button below to select the file or files that you shared during the communications session.

Select Content     Cancel planning meeting for this
stones that we would like

170 — Upload
2020 Yearly Project Goals Slides

175 — Upload
Project X Whitepaper

Monthly Planning Meeting

Meeting Information

Required: Anne Smith,
Optional: Paul Greene
Wednesday, March 4,

Description

Montly planning meet
project goals.

Meeting Summary

Transcript

Upload Related Content

You have selected the following files as being related content to be shared with other participants of the meeting:

☑ 2020 Yearly Project Goal Slides
☑ Project X White Paper

You may uncheck the checkbox by any items that you do not wish to upload.

Upload Content    Cancel

— 180 planning meeting for this
stones that we would ike

Upload — 170 des

Upload — 175

— 110

*No files attached at this time.*

FIG. 1M

Communication Session Information

Session ID: 1901121245775933

Participant Information:

| Index: 1 | Participant ID: | asmith@contoso.com | Name: Anne Smith |
| Index: 2 | Participant ID: | jaechoe@contoso.com | Name: Jae Choe |
| Index: 3 | Participant ID: | caleb@contoso.com | Name: Caleb Anand |
| Index: 4 | Participant ID: | prgreene@contoso.com | Name: Paul Greene |
| Index: 5 | Participant ID: | achen@contoso.com | Name: Alice Chen |

Meeting Summary Information

Session ID: 19011212457593

Transcript
Information: /session-19011212457593/files/transcript.docx

Content
Information:

Title: Meeting Recording    Location: /session-19011212457593/files/video-session.docx Title: March 2020 Planning Meeting Slides    Location: /session-19011212457593/files/transcript.docx Files:

Title: 2020 Yearly Project Goals Slides    Location: /session-19011212457593/files/2020-goals.ppt Title: Project X Whitepaper    Location: /session-19011212457593/files/projectx.docx

CONTENT RECOGNITION WHILE SCREEN SHARING

BACKGROUND

Conventional communications platforms provide an environment for conducting online communication sessions in which at least a portion of the participants may be located remotely from one another and may share audio and/or video content with other participants to the communication session. Some conventional communications platforms facilitate "screen sharing" in which a first participant may share with the other participants to the communication session a rendering of at least a portion of the desktop or similar workspace of the first participant's computing device and/or a rendering of an application window being executed on the first participant's computing device. The first participant may share a content item, such as but not limited to a slide presentation or a document with the other participants. Participants to the communication session may wish to later refer to the shared content. However, unless the participant sharing the content distributes the content to the participants of the communication session, the shared content is often unavailable to the other participants. There are significant areas for new and approved mechanisms for the communications platform to automatically identify content items shared during a communication session and to provide access to the content item to the participants of the communication session.

SUMMARY

An example data processing system according to the disclosure may include a processor and a computer-readable medium storing executable instructions. The instructions cause the processor to perform operations that include establishing a communication session between a plurality of computing devices of a plurality participants in which media content associated with the communication session is provided to each of the computing devices of the plurality of participants; receiving, via a network connection, a first media stream from the computing device of a first participant of the plurality of participants that includes a rendering of a first content item to be shared with the plurality of participants; performing image analysis on pixel data of the first media steam to identify features of the first content item; identifying a first file associated with the first content item based on the features of the first content item; and providing to the participants of the communication session access to the first file associated with the first content item.

An example method performed by a data processing system for conducting a communication session between a plurality of computing devices of a plurality participants according to the disclosure includes establishing a communication session between a plurality of computing devices of a plurality participants in which media content associated with the communication session is provided to each of the computing devices of the plurality of participants; receiving, via a network connection, a first media stream from the computing device of a first participant of the plurality of participants that includes a rendering of a first content item to be shared with the plurality of participants; performing image analysis on pixel data of the first media steam to identify features of the first content item; identifying a first file associated with the first content item based on the features of the first content item; and providing to the participants of the communication session access to the first file associated with the first content item.

An example memory device according to the disclosure stores instructions that, when executed on a processor of a data processing system, cause the data processing system to conduct a communication session between a plurality of computing devices of a plurality participants by establishing a communication session between a plurality of computing devices of a plurality participants in which media content associated with the communication session is provided to each of the computing devices of the plurality of participants; receiving, via a network connection, a first media stream from the computing device of a first participant of the plurality of participants that includes a rendering of a first content item to be shared with the plurality of participants; performing image analysis on pixel data of the first media steam to identify features of the first content item; identifying a first file associated with the first content item based on the features of the first content item; and providing to the participants of the communication session access to the first file associated with the first content item.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 1A, 1B, 1C, 1D, 1E, 1F, 1G, 1H, 1I, 1J, 1K, 1L, and 1M are diagrams illustrating examples of user interfaces that may be displayed on a client device of a participant in a communication session.

FIG. 8 shows an example data structure for storing information for a communication session.

FIG. 9 shows an example data structure for storing meeting summary information for a communication session.

DETAILED DESCRIPTION

Figure 1A:
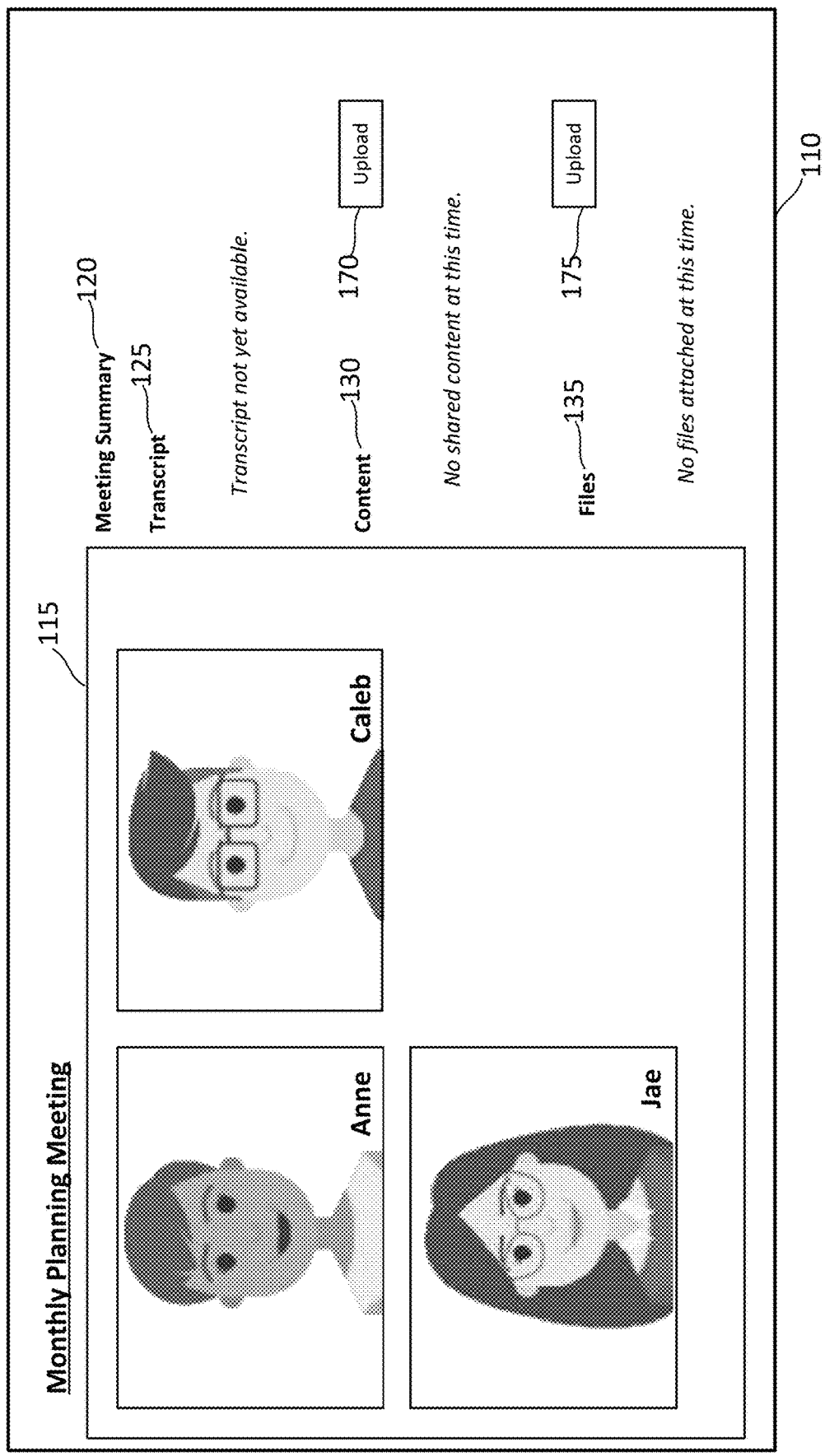

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for providing for content recognition while screen sharing are provided. These techniques may be implemented by a communications platform that enables users to participate in online communication sessions, such as but not limited to Microsoft Teams or Microsoft Skype for business. The techniques disclosed herein address a technical problem of how to effectively provide participants to a communication session with access to content items that are shared by a participant of the communication session. In a communication session provided by a conventional communications platform, a participant must remember to manually disseminate a shared content item to the other participants of the communication session via email or other means. The other participants often do not have access to the shared content item. Thus, if the participant sharing the content item does not remember to manually share this content item, the other participants to the meeting may not have access to this resource which may convey important information from the communication session. The techniques disclosed herein provide a technical solution to this problem by analyzing pixel data of one or more media streams received from the client devices of the participants to the communication session. The communications platform can extract features of the content item from this pixel data and correlate these features with the features of documents that are accessible to the communications platform to identify a file associated with the shared content item. If the communications platform is able to identify the file associated with the shared content item, the communications platform may automatically provide access to the shared content item to the participants of the communication session. The communications platform may distribute a link to or a copy of the content item to each of the participants and/or store a copy of the content item in the memory location on a server that is accessible to each of the participants of the communication session.

The techniques disclosed herein provide several technical benefits to participants of communication sessions. The communications platform provides an improved user experience by automatically identifying shared and/or related content items and providing access to those content items to the participants of the communication session. Automatically identifying shared and/or related content items and provides improved information dissemination to participants of the communication session. Furthermore, the communications platform may store copies of the shared and/or related content items in a meeting summary that persists after the communication session has been completed to provide a centralized repository of information that participants may refer back long after the communication session has been completed.

FIGS. 1A-1M show various aspects of a user interface 110 of a communications platform application that may be rendered on the display of a client device of a participant of a communication session provided by a communications platform. The client device may be implemented by a client device 205 and the communications platform may be implemented by the communications platform 230 illustrated in FIG. 2, both of which will be described in greater detail in the examples that follow. The user interface 110 may be rendered on the client device of the participant by an application that is executed on the client device, such as the communications platform application 245 illustrated in FIG. 2. The communications platform application may instead be a cloud-based application 235 with a user interface that may provided to the client device of the participant as a web page for rendering in a browser application on the client device.

The user interface 100 includes a content pane 115 that can be used to render content associated with an online communication session. In FIG. 1A, the content pane 115 includes a rendering representing three participants to the meeting: Anne, Caleb, and Jae. These representations may be labeled with the name of each of the participants in this example implementation. The representations of each of the participants may be a still photo of each of the participants and/or may be a video stream of a respective one of the participants captured by the participant's client device. In this example, the user interface 100 includes a meeting summary section 120 that can be used to display content related to the online communication session. The example shown in FIG. 1A includes a transcript section 125, a content section 130, and a file section 135. The transcript section 125 can be used to display at least a portion of a transcript of the communication session and/or a link to the transcript that may be clicked upon or otherwise activated by a user to cause the user interface 100 to display the transcript. The communications platform may be configured to process media streams received from each of the client devices of the participants to the communication session using natural language processing techniques to generate a transcript that includes a textual representation of the conversation that occurred during the communication session. In some implementations, the communications platform may be configured to identify which participant was speaking at a particular time throughout the communication session. The transcript may be divided into segments that are each annotated with a label indicating which participant was speaking for each segment of the transcript.

The content section 130 may be used to display content that was shared during the communication session. For example, if a first participant shares a slide presentation with the participants to the communication session, the slide presentation may automatically be identified and distributed to the participants of the communication session according to the techniques disclosed herein. One way in which the content may be distributed to participants of the communication session is for the communications platform to associate a copy or a link to a copy of the content with the communication session, and the participants to the communication session can access the content associated with the communication session via the communications platform application. FIGS. 8 and 9 show examples of data structures that may be used to represent the communication session and the meeting summary information associated with a communication session, respectively. These data structures will be described in greater detail in the examples which follow in which content and files are associated with the communication session. Another way in which content may be distributed to participants of the communication session, in addition to or instead of the associating the content with the communication session, is to send a copy of the content or a link to the content to each of the participants via email, text message, and/or other means. The communications platform may push a copy of the content over a network connection to the communications platform application on the client device of each of the participants of the communication session. The content section 135 may include an upload button 170 to allow a participant to upload shared content to the content section 130 of the meeting summary 120. FIGS. 1J and 1K, which will be discussed in greater detail in the examples that follow.

The file section 135 may be used to display content that may be relevant to or related to the content of the communication session but was not shared during the communication session. The content included in the file section 135 may be automatically identified by the communications platform using the techniques disclosed herein. The examples which follow include additional details discussing how the communications platform may identify the files that may be relevant to and/or related to the content of the communication session. The file section 135 may also include files that have been uploaded by one or more participants of the communication session. The user interface 110 of the communications platform application may provide elements allow participants of a communication session to upload files associated with the communication session before, during, and/or after the communication session. The communication session may persist for at least a predetermined period of time after the online meeting has taken place to allow participants to access such content and/or files associated with the communication session. The communication session platform may permit participants to resume an online meeting. Examples illustrating how files may be associated with the communication session and added to the meeting summary information associated with the communication session will be discussed in greater detail with respect to FIGS. 8 and 9. The file section 135 may include an upload button 175 to allow a participant to upload content to the file section 135 of the meeting summary 120. FIGS. 1L and 1M, which will be discussed in greater detail in the examples that follow.

Figure 1B:
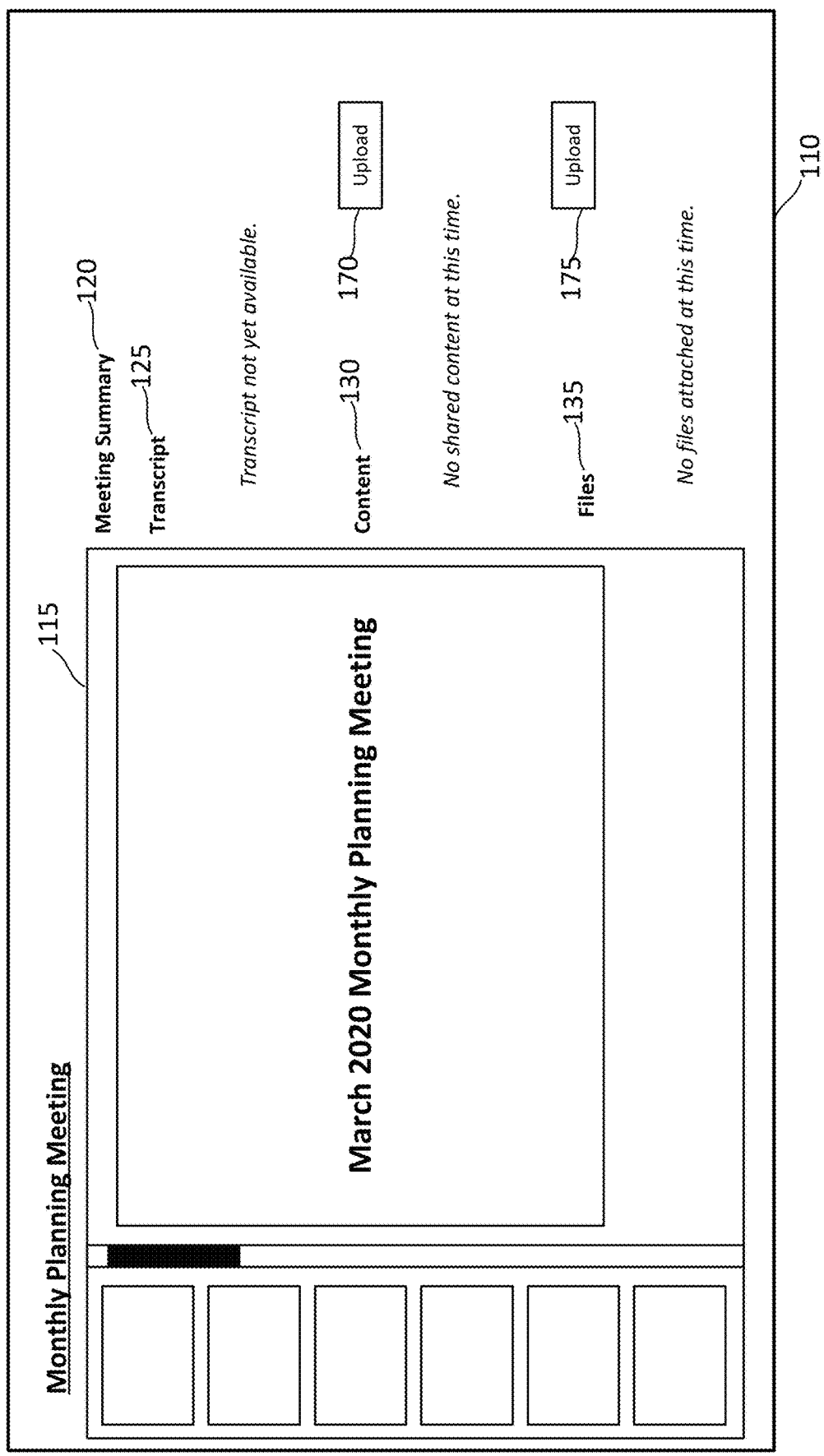

FIG. 1B illustrates an example of the user interface 110 in which the online meeting illustrated in FIG. 1A continues and the participant Anne shares her screen with the participants Jae and Caleb. The shared content in this example is a set of slides for a Monthly Planning Meeting presentation. The shared content is rendered in the content pane 115. The communications platform may be configured to detect in a media stream received from a client device when a participant shares a content item, to perform image analysis on pixel data of the first media steam to identify features of the first content item, to identify a file associated with the shared content item, and to provide access to the file associated with the content item to the participants of the communication session.

Figure 1C:
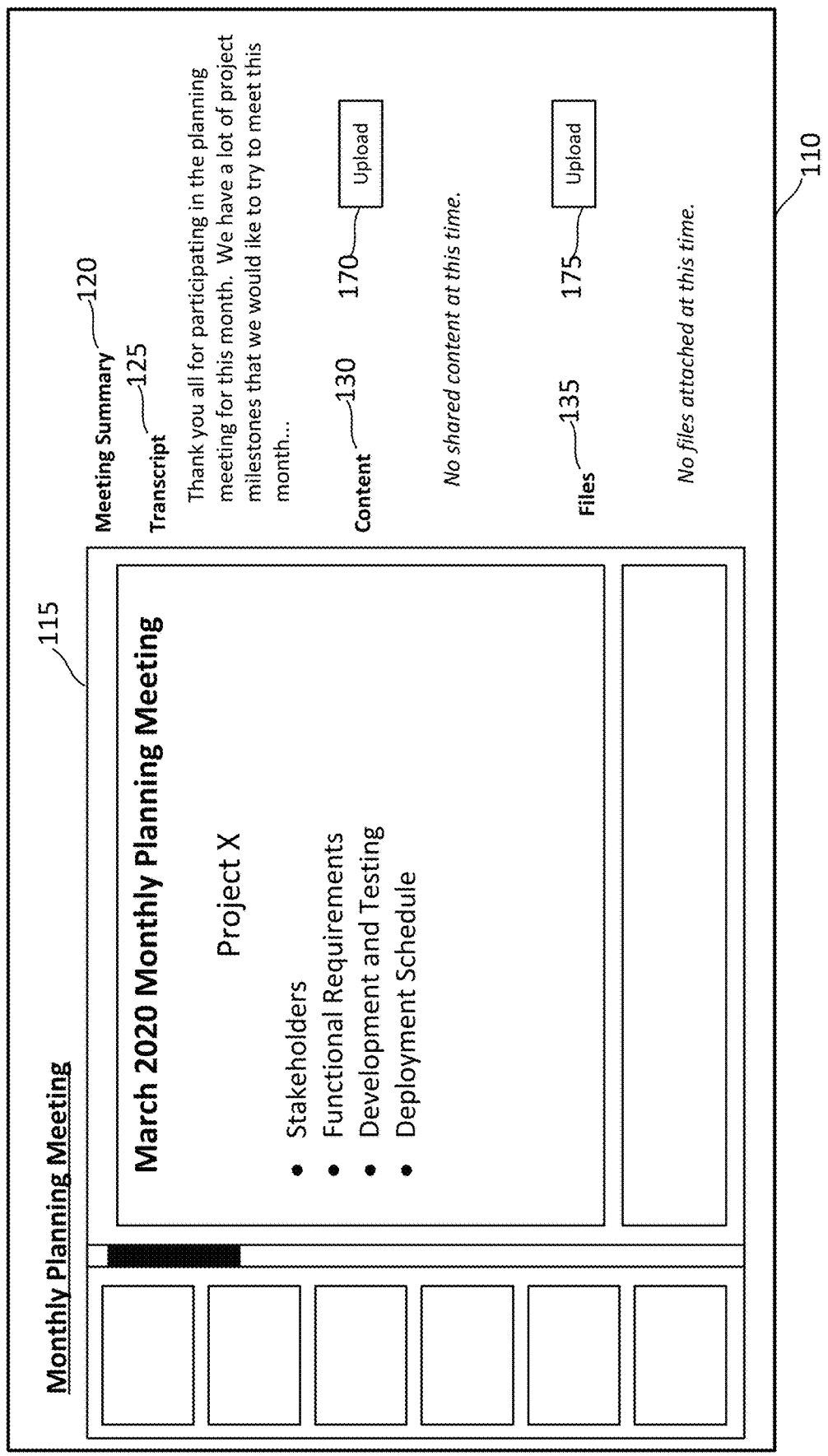

FIG. 1C shows an example of the user interface 110 in which the online meeting illustrated in FIG. 1B continues and the participant Anne continues shares her screen with the participants Jae and Caleb. In the example illustrated in FIG. 1C, the communications platform has begun to generate the transcript for the online communication session. In this example implementation, the transcript may be generated in substantially real-time as the online communication session is taking place, and a copy of the transcript and/or a link to the transcript may be added to the transcript section 125 of the meeting session section 120. In other implementations, the transcript may be generated after the online meeting session is completed and the transcript may be added to the transcript section 125 of the meeting session section 120 once available.

The communications platform may maintain communication session information in a memory of one or more data processing systems of the communications platform to keep track of the communication sessions and content associated with the communication session. FIGS. 8 and 9 provide examples data structures that the communications platform may use maintain communication session information. These data structures may be stored in a relational database or other searchable and updateable data store that permits the communications platform to create new entries for communication sessions and to access or modify records for existing communication sessions.

FIG. 8 shows an example communication session information 810 data structure for storing information for each communication session. The communication session information 810 may include a session identifier that uniquely identifies the communication session and participant information that identifies each of the participants of the communication session. The participant information may include information for participants that were invited to participate in the online communication session but were unable to attend the meeting. The communications platform may permit these participants to access the content and/or files associated with the communication session even if they were unable to attend.

FIG. 9 shows an example meeting summary information 910 data structure that may be used by the communications platform to store information associated with the communication session. In some implementations, the meeting summary information 910 may be included in the communication session information 810. In other implementations, such as the example, the meeting summary information 910 may be maintained as separate record by the communications platform. Referring back to FIG. 1C, the transcript of the online communication session may be created substantially in real-time as the meeting is underway. The communications platform may create a meeting summary information 910 record for the communication session if one does not already existing and add transcript information to the meeting summary information 910 that identifies a location of the transcript. The meeting summary information includes a file location in which the transcript is stored. The meeting summary information may also include content information for files to be included in the content section 130 of the user interface 110 and files information for files to be included in the files section 135 of the user interface 110. The meeting summary information 910 may include a title and file location for the files to be included in the content section 130 and the file section 135.

In the example illustrated in FIG. 1D, a slide from the March 2020 Monthly Planning Meeting Slides document is displayed in the content pane 115 of the user interface 110. The example illustrated in FIG. 1D shows an example of the Monthly Planning Meeting from the preceding examples in which the communications platform has added a content items to the content section 130. In this example, the online communication session has been completed, but the participants to the online communication session may still access content related to the communication session stored on the communications platform.

The first item in the content section 130 is a meeting recording. The communications platform may generate an audio recording and/or video recording of the meeting that serves as a record of the communication session that may later be played back by participants to the communication session. In addition to the meeting recording, the slide presentation shared in FIG. 1C for the March 2020 Monthly Planning Meeting has been identified by the communications platform using the techniques that will be discussed in greater detail in the examples that follow.

The file associated with the March 2020 Monthly Planning Meeting has been associated with the communication session and is accessible to participants to the communication session. The file may be downloaded by the participants to permit the participants to view the contents of the file on the client device or on another computing device. The file may also be accessed displayed in the content pane 115 of the user interface 110 by clicking on the representation of the file in the content section 130. In the example illustrated in FIG. 1D, the file that includes the slides has been updated to include a portion of the transcript 125 of the communication session that was discussed for each of the slides. For example, the slide presentation may include a notes section that allows for notes to be added to each of the slides. The communications platform may be configured to determine which slide was being displayed during particular time during the communication session and to correlate that time period with the related portion of the transcript of the discussion that took place during that time period. The related portion of the transcript can be inserted into the notes section of the document as illustrated in FIG. 1D. While the example illustrated in FIG. 1D includes a set of slides in which the related transcript sections were inserted, section of the transcript may be inserted into other types of documents as well. For example, if a text document is shared during the meeting, a section of the transcript may be inserted as a comment or annotation to the document at a location in the document that was displayed during the time period of the communication session that corresponds to that part of the transcript.

The files section 135 also includes representations two files that the communications platform identified as being related to the Monthly Planning Meeting. The first file is a set of 2020 Yearly Project Goal Slides and the second file is a Project X Whitepaper. The communications platform identified these files as potentially being related to the Monthly Planning meeting based on features of the content shared during the communication session. The techniques used by the communications platform to identify the files displayed in the files section 135 will be discussed in greater detail in the examples that follow.

FIG. 1E shows another example implementation in which the transcript 125 may be updated to include portions of the content items shared during the communication session. In the example illustrated in FIG. 1E, the contents of the transcript 125 are displayed in the content pane 125 and the transcript 125 has been updated to include slides from the March 2020 Planning Meeting Slides which were discussed during the communication session. The transcript 125 may be viewed in the content pane 115 of the user interface 110 by clicking on the transcript 125. A participant may also access the communication session via the user interface 110 and download the transcript 125 for viewing outside of the communications platform application.

The communications platform may be configured to correlate portions of the shared content with portions of the transcript based on the time that a respective portion of the content item was shared. In the example illustrated in FIG. 1E, the slide for "Project X" from the March 2020 Monthly Planning Meeting slides has been added to the transcript. The communications platform may be configured to identify the portion of the document that was shared in during the communication session by analyzing the pixel data of the media stream received from the client device from which the participant shared the content item. The characteristics of the shared portion of the content item can be correlated with the document to identify the relevant portions. For example, a slide or set of slides from a set of slides may be identified and added to the transcript or a paragraph or set of paragraphs or a page or set of pages from a document may be added to the transcript. A document may include text and/or image content which may be copied into the transcript. In some implementations, a link to the content item may be added to the transcript in addition to or instead of the excerpt from the content item. In situations where the communications platform is unable to identify the file associated with the content item that is shared during the communication session, the communications platform may add an image extracted from the pixel data of the media stream into the transcript instead of a portion extracted from the document.

Figure 1F:
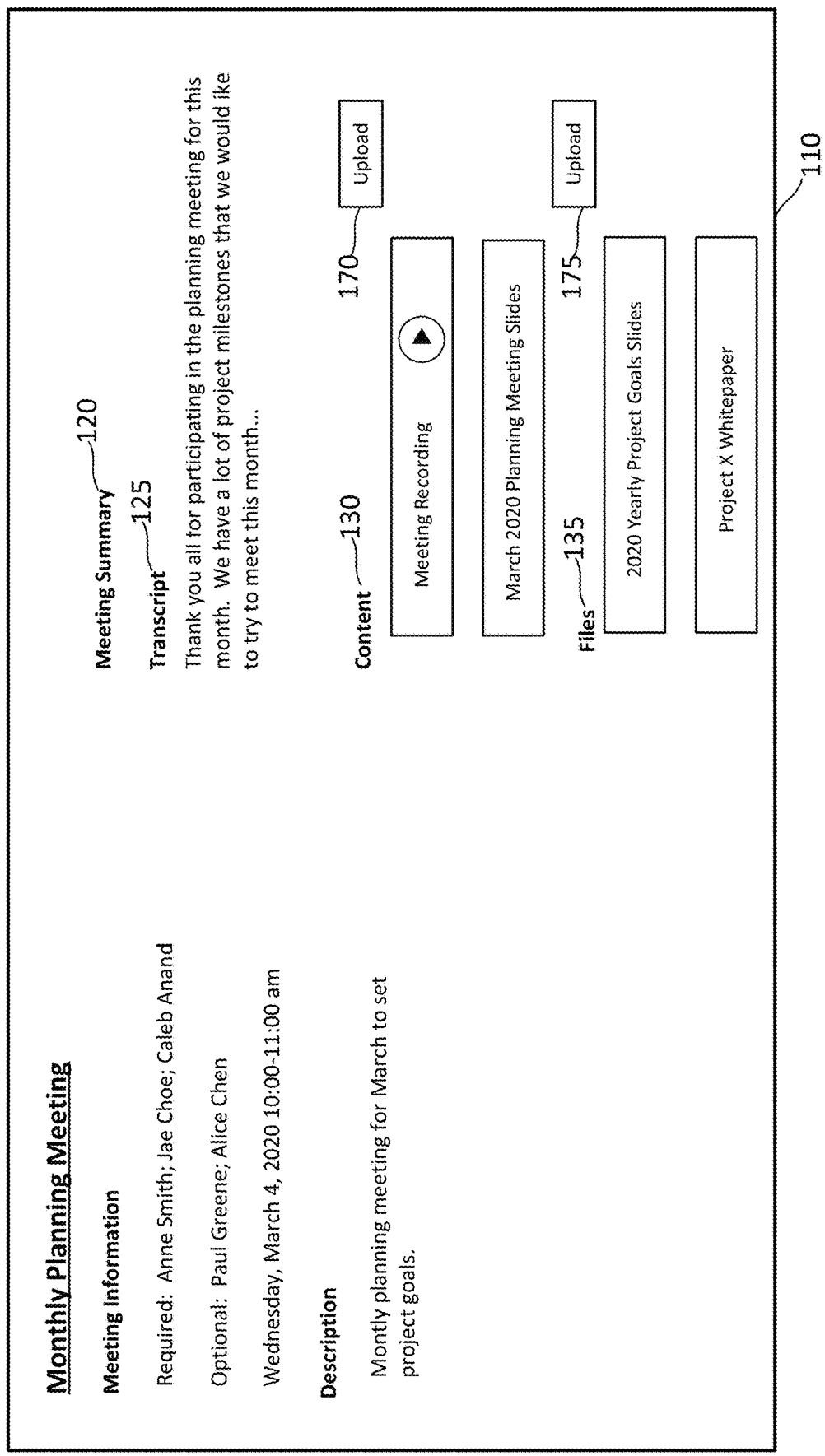

FIG. 1F shows an example of the user interface 110 for a communication session that has been completed. The communications platform may be configured to permit participants to later access the communication session information included on this summary page. Participants may add additional files to the files section 135 to be shared with other participants of the communication session. Participants may also via the transcript and/or content items from the content section 130. The user interface 110 may display the transcript in the content pane 115 as in the example of FIG. 1E or the other content item in the content pane 115 as in the example of FIG. 1D. The summary screen may also include additional information (not shown) such as which participants joined the online communication session, the date and time of the online communication session, the duration of the communication session, information regarding which participants shared and/or uploaded files associated with the communication session.

Figure 1G:
Figure 1J:
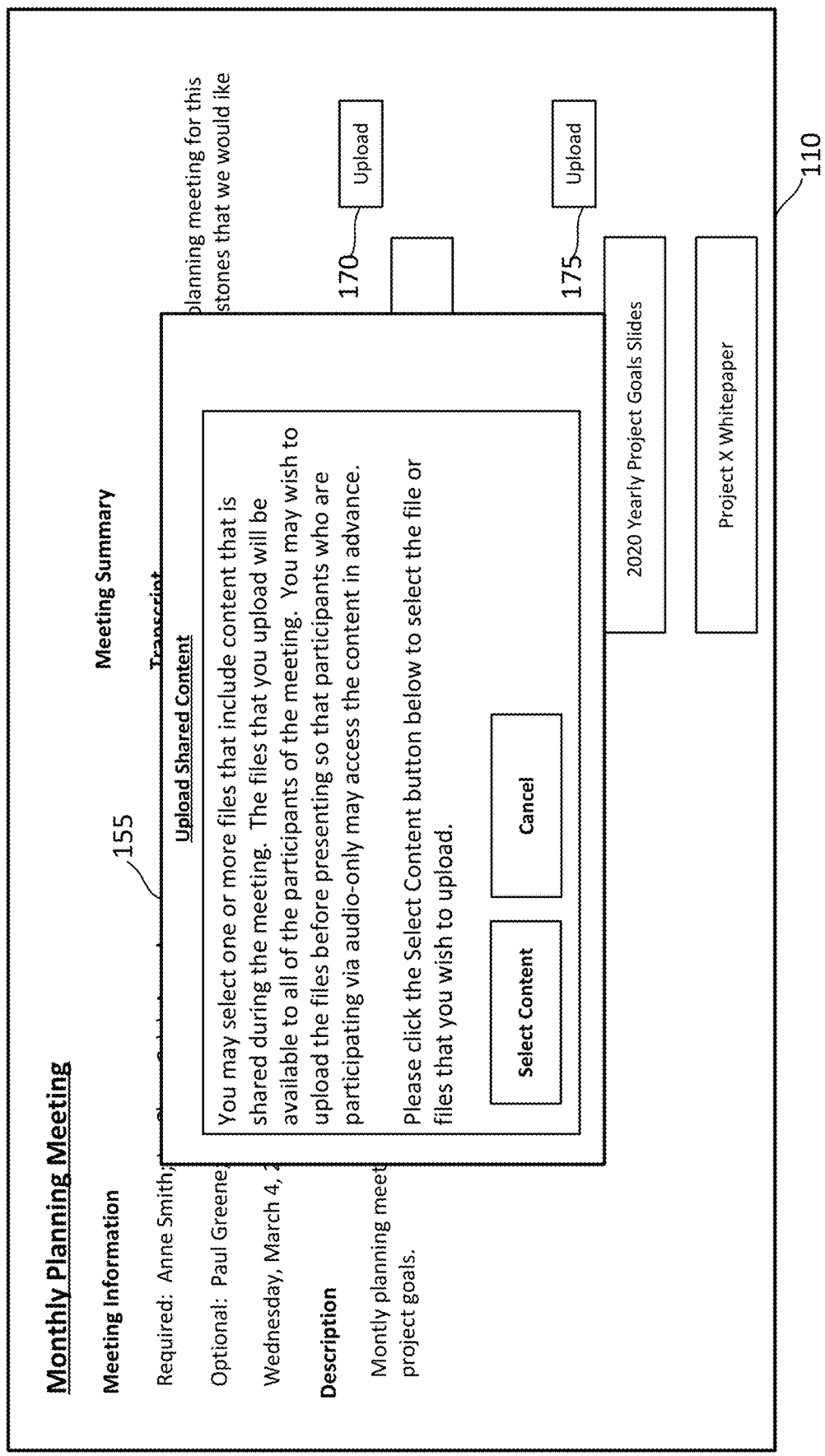
Figure 1K:
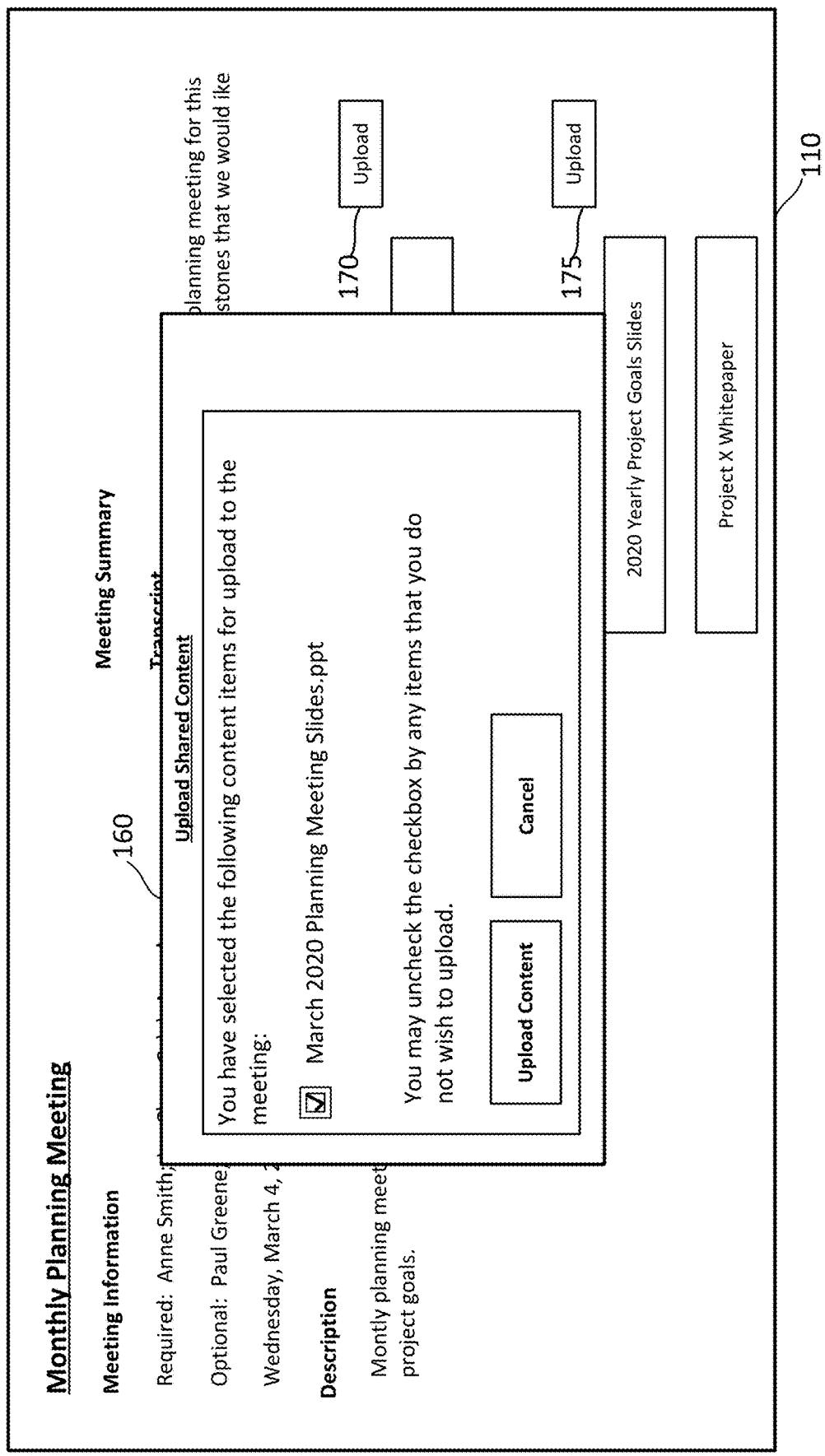
Figure 1L:
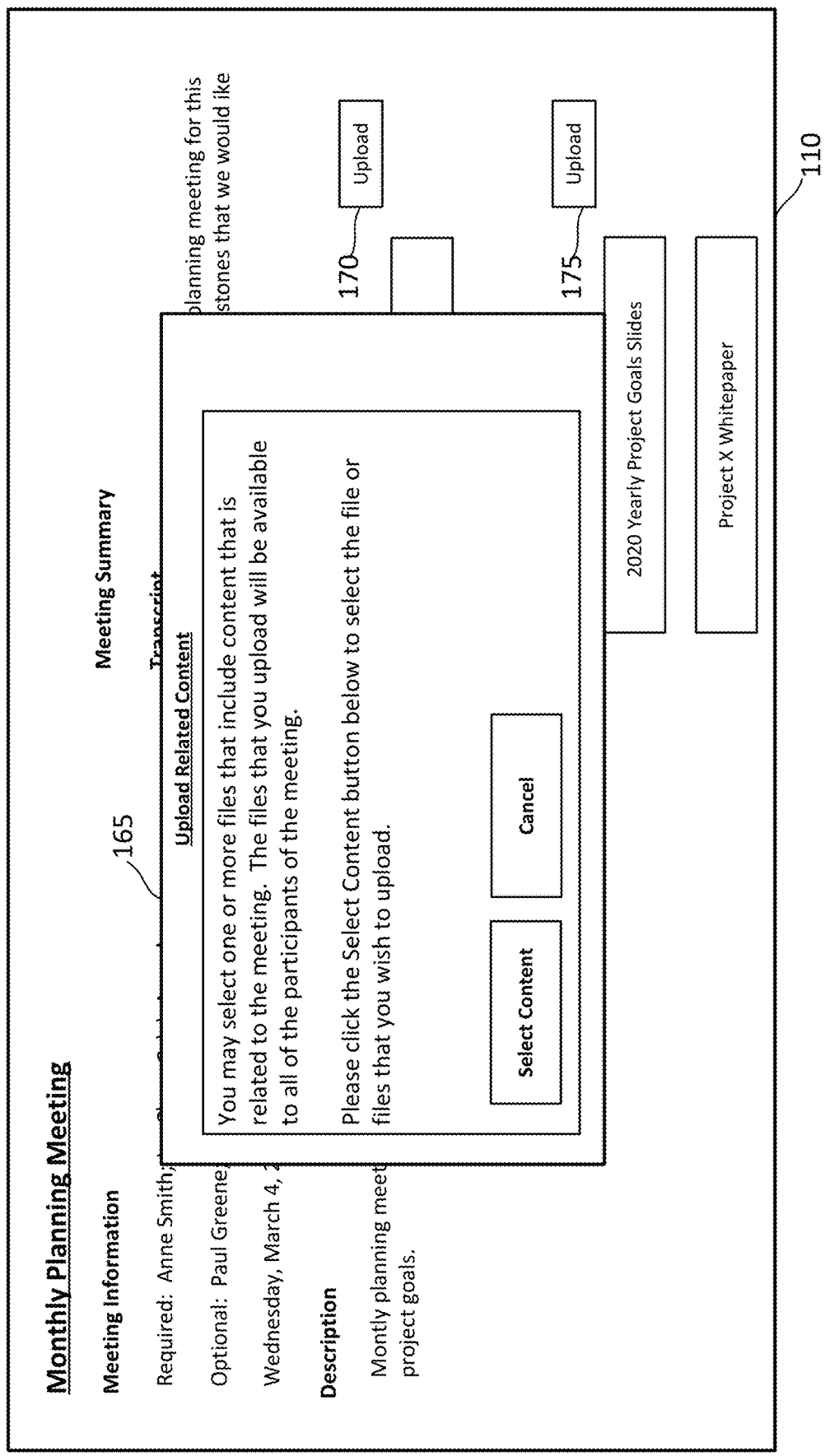

FIG. 1G shows an example of an upload shared content interface 140 that may be used with the user interface 110 to prompt a participant to upload shared content. The communications platform 230 may identify content that was shared during the communication session and provides a participant with an opportunity to provide access to that content to the participants of the communication session. The upload shared content interface 140 may be displayed to a participant that shared content during the communication session. The upload shared content interface 140 may be displayed to the participant in situations where the participant has not authorized automatic file upload of content items that were shared during the presentation. In some implementations, the communications platform may permit participants to configure various operating parameters of the communications platform that apply to their user session. For example, participants may be able to configure the communications platform to automatically upload any content items that the user shares during a communication session. If this option is unavailable or is turned off for a particular participant, the communications platform may prompt the participant to upload the content item. In implementations where the participant is participating in the communication session via a communications platform application on their client device, the communications platform application may send a signal to the communications platform application via network connection to cause the communications platform application to display the upload shared interface 140. In implementations where the participant is participating in the communication session via a cloud-based application, the communications platform can cause the cloud-based application to render the upload shared content interface 140.

In the example illustrated in FIG. 1G, the communications platform has identified a single document related to the communication session illustrated in the preceding examples. The communications platform identified the file "March 2020 Planning Meeting.ppt" as having been shared by the participant. The upload shared file interface 140 may include multiple content items if the communications platform has identified more than one content item that was shared. The participant may uncheck the checkbox next to a content item if the participant does not wish to upload a particular content item or may click the "cancel" button to cancel the upload of any content items. The participant may click on the "upload content" button to cause the communications platform to upload a copy of the content item(s) to a memory location associated with the communications platform from which the participants of the communication session may access the content items. The communications platform may update the meeting summary information 910 associated with the communication session to include a title, filename, file location, file type, and/or other information associated with the uploaded copy of the content item.

FIG. 1H shows an example of an upload related content interface 145 that may be used with the user interface 110 to prompt a participant to upload content that the communications platform has identified as possibly being related to or relevant to the communication session. The communications platform 230 may identify content that may be related to the communication session and provides a participant with an opportunity to provide access to that content to the participants of the communication session. The upload related content interface 145 may be used to populate the file section 135 of the meeting summary 120. In some implementations, the communications platform may display the upload related content interface 145 to the meeting organizer to allow the meeting organizer to determine whether or not to associate the related content with the communication session. The related files listed on the upload related content interface 145 may be identified by the communications platform using various techniques that will be described in detail in the examples that follow.

In the example illustrated in FIG. 1H, the communications platform has identified two documents that may be related to the communication session illustrated in the preceding examples. The communications platform identified the file "2020 Yearly Project Goal Slides.ppt" and "Project X White Paper" as being content related to the communication session. The upload related content interface 145 may include multiple content items if the communications platform has identified more than one content item that was shared. The participant may uncheck the checkbox next to a content item if the participant does not wish to upload a particular content item or may click the "cancel" button to cancel the upload of any content items. The participant may click on the "upload content" button to cause the communications platform to upload a copy of the content item(s) to a memory location associated with the communications platform from which the participants of the communication session may access the content items. The communications platform may update the meeting summary information 910 associated with the communication session to include a title, filename, file location, file type, and/or other information associated with the uploaded copy of the content item.

In the example illustrated in FIG. 1I, the communications platform has determined that the participant was screen sharing during the communication session but was unable to locate the content item that was shared. In FIG. 1I, the upload shared content interface 150 may be displayed to the participant. The participant is asked to upload the content item or content items that were shared during the communication session. The user may click the "cancel" button to cancel the upload of any content items. Otherwise, the user may click on the "select content" button to select the file or files associated with the shared content item or items. Once the user has selected the content items, the upload shared content interface 160 illustrated in FIG. 1K, which is similar to the upload shared content interface 140. The upload shared file interface 140 may include multiple content items if the communications platform has identified more than one content item that was shared. The participant may uncheck the checkbox next to a content item if the participant does not wish to upload a particular content item or may click the "cancel" button to cancel the upload of any content items. The participant may click on the "upload content" button to cause the communications platform to upload a copy of the content item(s).

In the example illustrated in FIG. 1J, the communications platform may display the upload shared content interface 160 in response to the participant clicking the button 170 associated with the content section 130 of the meeting summary 120. The participant is asked to upload the content item or content items to be made available to participants of the communication session. The user may click the "cancel" button to cancel the upload of any content items. Otherwise, the user may click on the "select content" button to select the file or files associated with the shared content item or items. Once the user has selected the content items, the upload shared content interface 160 illustrated in FIG. 1K may be displayed which may be used to upload selected content items as discussed in the preceding example.

In the example illustrated in FIG. 1L, the communications platform may display the upload related content interface 165 in response to the participant clicking the button 175 associated with the files section 135 of the meeting summary 120. The participant is asked to upload the content item or content items to be made available to participants of the communication session. The user may click the "cancel" button to cancel the upload of any content items. Otherwise, the user may click on the "select content" button to select the file or files associated with the shared content item or items. Once the user has selected the content items, the upload shared content interface 180 illustrated in FIG. 1M may be displayed which may be used to upload selected content items. The participant may click on the "upload content" button to cause the communications platform to upload a copy of the content item(s). The uploaded content items will be displayed under the file section 135 of the meeting summary 120 which is available to each of the participants of the communications session.

The user interface 110 of participants may be dynamically updated as content items are uploaded to any of the sections of the meeting summary 120 discussed in the preceding examples.

Figure 2:
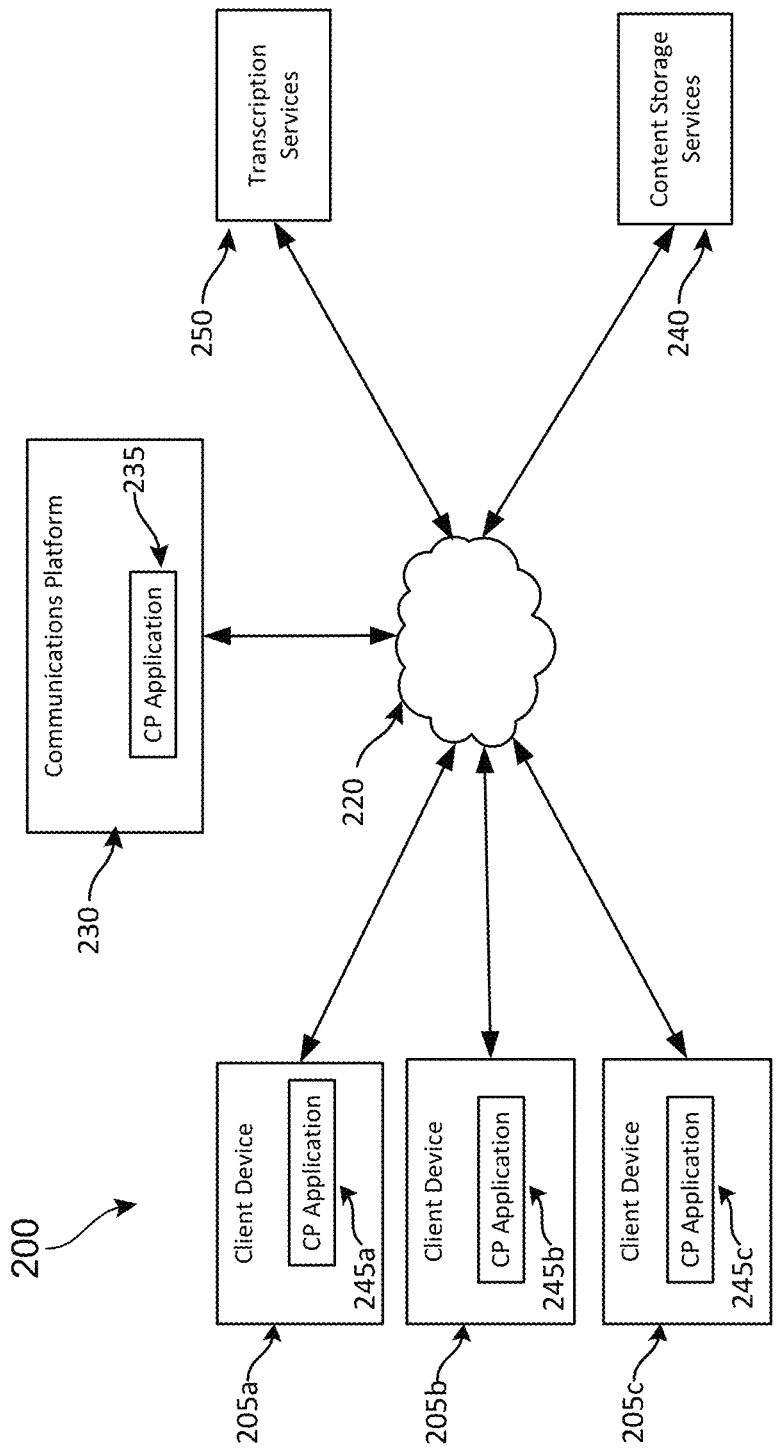
FIG. 2 shows an example computing environment in which the techniques disclosed herein may be implemented.

FIG. 2 shows an example computing environment 200 in which the techniques disclosed herein may be implemented. The computing environment 200 may include the communication platform 230, a network 220, content storage services 240, transcription services 250, and client devices 205a-205c. The network 220 may include one or more public and/or private networks and may be implemented, a least in part, by the Internet.

The client devices 205a-205c are computing devices that may have the capability to present and/or capture one or more type of media stream associated with the communication session. Such media streams may comprise audio, video, images, text content, and/or other types of content. Each of the client devices 205a-205h may have different capabilities based on the hardware and/or software configuration of the respective remote device. While the example illustrated in FIG. 2 includes three client devices, a communication session may include fewer than three client devices or may include more than three client devices. The client devices 205a-205c may be implemented as a portable electronic device, such as a mobile phone, a tablet computer, a laptop computer, a portable digital assistant device, a portable game console, and/or other such devices. The client devices 205a-205h may also be implemented in computing devices having other form factors, such as a vehicle onboard computing system, a video game console, a desktop computer, and/or other types of computing devices.

The client devices 205a-205c may include a communications platform application 245 that facilitates communications between the client devices and the communications platform 230. The communications platform application may provide for real-time voice communications, video communications, text-based communications, or a combination thereof via the communications platform 230. Other types of content may also be shared using the client application, such as files and/or other content. The application may be configured to receive, via the network 220, media streams associated with the communication session and to present those media streams via one or more user interface components of the computing device. The computing devices 205a-205c may include one or more input components, including a microphone and/or other audio input components, a camera or other image and/or video input component, a keyboard, a touch screen interface, and/or other input device for receiving textual and/or other inputs. The application may process the inputs from the input components to generate one or more media streams comprising content associated with the participant to the communication session using the computing device and may send the one or more media streams to the communications platform 230. The application may also be configured to send a signal to the communications platform 230 requesting that a participant be admitted to a communication session being hosted by the communications platform 230. In some implementations, the application may be a cloud-based application 235 hosted on the communications platform 230, and the communications platform 230 may provide a user interface that may be rendered by a web browser or other similar application on the client device. The functionality of the cloud-based application 235 may be substantially the same as the functionality of the communications platform application 245.

During a communication session, the communications platform 230 may receive one or more media streams from each of the client devices 205a-205c. The communications platform may analyze the media stream(s) received from a client device by performing image analysis on the pixel data of the media stream(s) to identify features of a first content item being shared by a participant of the communication session. The media streams may include audio, video, images, text content, and/or other types of media stream.

As illustrated in the examples illustrated at least in FIGS. 1B and 1C, a participant may share a content item with other participants to the communication session. The client device 205 associated with that participant may generate a media stream that includes a video and/or a series of still images of the shared content item. The media stream may be generated and transmitted in substantially real time to the other participants of the communication session via the communications platform 230. The communications platform 230 may be configured to receive the media stream(s) from each of the client devise 205a-205c.

Figure 10:
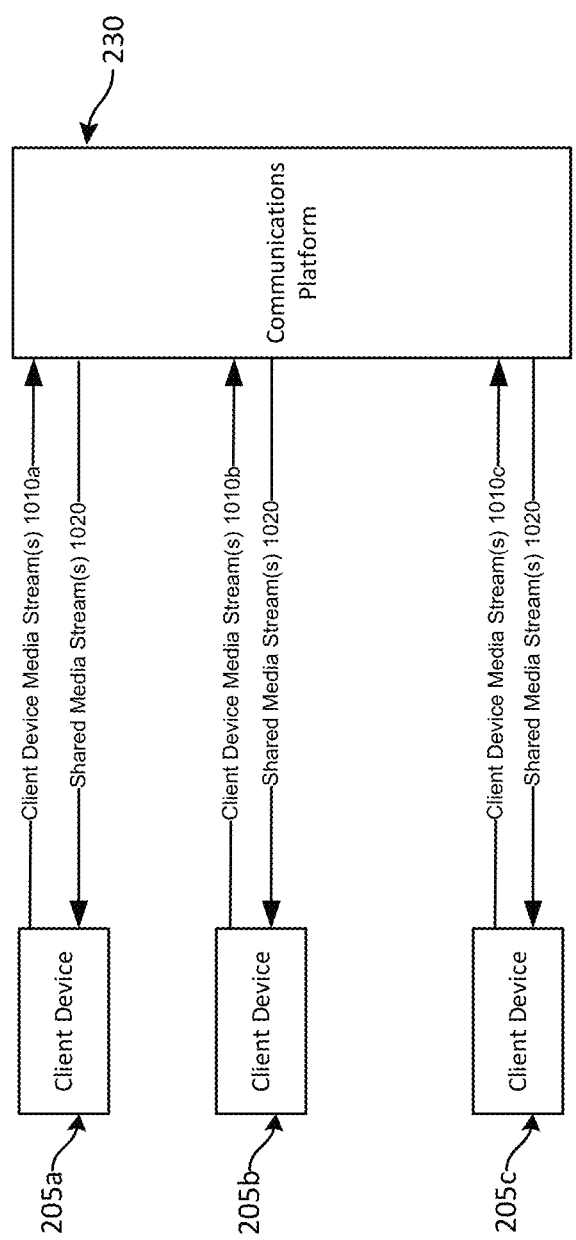
FIG. 10 is a diagram showing example media streams that may be generated to support a communication session.

FIG. 10 shows is a diagram illustrating example media streams that may be generated to support a communication session. The client devices 205a-205b may generate one or more client device media stream(s) 1010a, 1010b, and 1010c. The communications platform 230 may receive the client device media stream(s) 1010a, 1010b, and 1010c and generate the shared media stream(s) 1020 that are transmitted to each of the participants of the communication session. The communications platform 230 may merge the audio received from the client devices 205a, 205b, and 205c into a single audio stream that includes all of the audio from all of the participants in one stream. The communications platform 230 may merge the video content received from the client devices 205a, 205b, and 205c into a single video stream. The video stream may include representation of each of the participants admitted to and participating in the private communication subsession or may include a representation of a participant that is determined to be speaking. The video stream may also include a rendering of a content item that is being shared by a participant of the communication session. The communications platform application 245 may then render at least a portion of the contents of the shared media stream(s) 1020 in the user interface 110. In some implementations, content from the shared media stream(s) may be displayed in the content pane 115 of the user interface 110.

Content storage services 240 is a cloud-based service that may optionally be utilized to store content items on behalf of one or more of the participants of a communication session and/or on behalf of the communications platform 230. The content storage services 240 may provide for online storage of content items, sharing of content items, backup and recovery services for recovering content to a client device, and/or other services. In some implementations, the content storage services 240 may be implemented by Microsoft® OneDrive® or may be implemented by Microsoft® SharePoint®.

Transcription services 250 are a cloud-based service that may optionally be utilized to generate the transcript 125 for the communication session. The communications platform 230 may transmit the one or more audio streams associated with the communication session to the transcription services 250 and the transcription services 250 may transmit the transcript 125 to the communications platform 230. The communications platform 230 may be configured to perform preprocessing of the audio stream(s) provided to the transcription services 250. For example, the communications platform 230 may encode the audio stream(s) using Free Lossless Audio Codec (FLAC) which provides lossless compression of the audio signals or another type of encoding supported by the transcription services 250. The transcript 125 may provide a written record of what is said by participants during the communication session. The transcription services 250 may be configured provide diarized transcripts that not only include what was said during the communication session but also who said what during the communication session. In some implementations, the functionality of the transcription services 250 may be implemented by the communications platform 130. In some implementations, the transcription service 250 may generate the transcript for the communication session is substantially real-time. The communications platform 230 may transmit the one or more audio streams to the transcription service 250 as the client device media streams 1010 are received from the client devices 205. The transcription service 250 may continually update the transcript 125 and send updated versions to the communications platform 230 as the transcript is updated.

Figure 3:
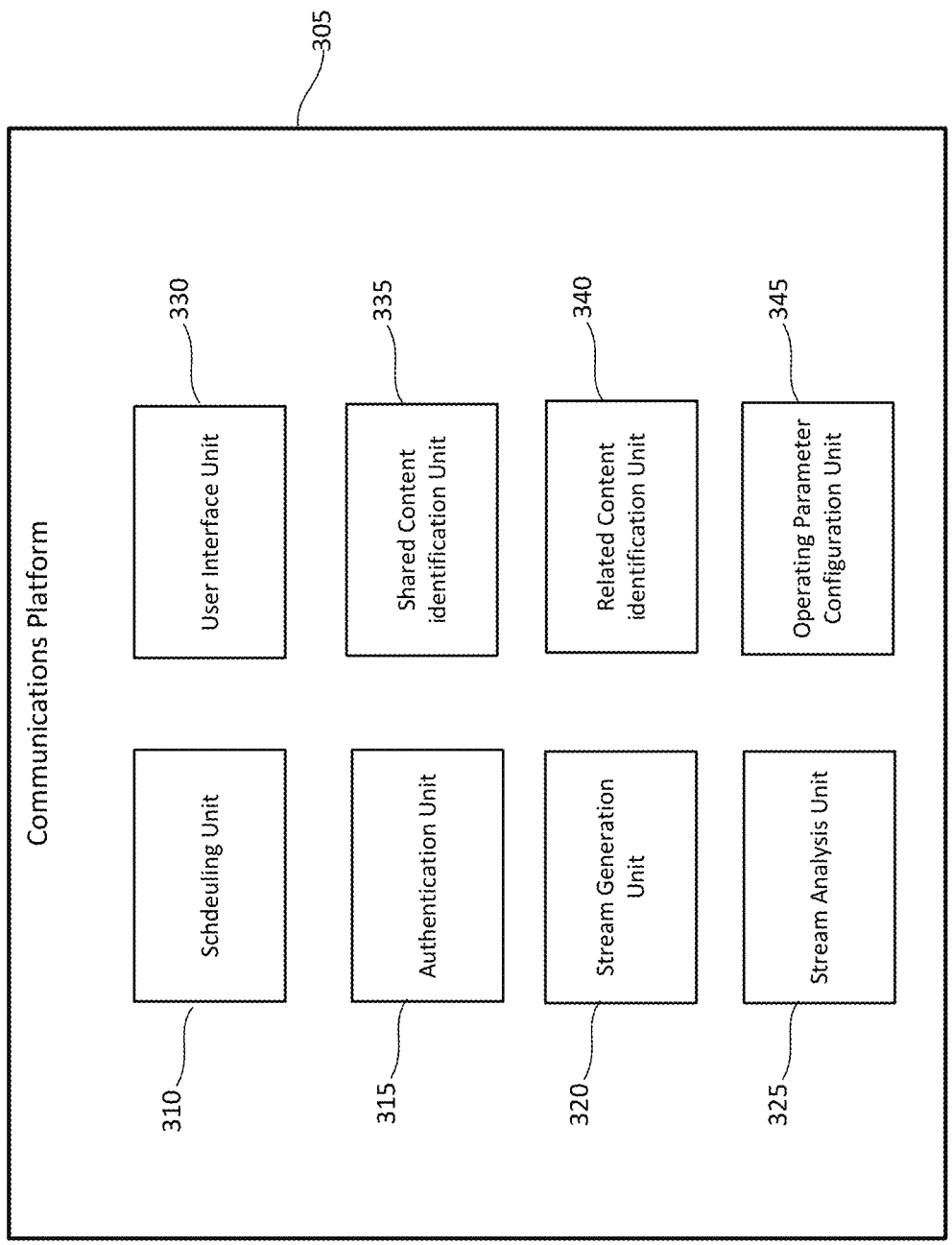
FIG. 3 is a block diagram of an example communication session management unit which may be implemented by the communications platform shown in FIG. 2.

FIG. 3 is a block diagram of an example communication session management unit 305 which may be implemented by the communications platform 230. The communication session management unit 305 may include a scheduling unit 310, an authentication unit 315, a stream generation unit 320, a stream analysis unit 325, a user interface unit 330, a shared content identification unit 335, a related content identification unit 340, and an operating parameter configuration unit 345. The communication session management unit 305 can be implemented by processor-executable program code, hardware, or a combination thereof, and may be implemented by the example software architecture 600 of FIG. 6 and/or the example computing device 700 illustrated in FIG. 7.

The scheduling unit 310 may be configured to provide means for scheduling an online meeting or other such communication session. The scheduling unit 310 may provide an interface through which a user may invite one or more participants to the online meeting. The scheduling unit 310 may receive contact information, such as a user email address or other contact information, that the scheduling unit 310 may use to electronically send an invitation to the one or more participants. The scheduling unit 310 may also be configured to receive responses from participants indicating whether the participants have accepted the invitation to the online communication session. The scheduling unit 310 may also provide participants with the ability to propose an alternate date and/or time for the online communication session.

The authentication unit 315 may be configured to authenticate participants in response to a request from a participant's client device 205 to be admitted to a communication session. The authentication unit 315 may be configured to accept a participant identifier and a session identifier included in the request to be admitted the communication session to determine whether the participant should be admitted to the communication session. In some implementations, the authentication unit 315 may request authentication credentials for the participant, such as a username and password, to authenticate the user. Such a configuration may be used by a corporation or other entity to ensure that a third party that is not authorized to participate in the communication session has not obtained an invitation to the communication session. The authentication unit 315 may also support other authentication techniques, such as but not limited to federated authentication, for determining the identity of a participant.

The stream generation unit 320 may be configured to receive one or more media streams from the client device 205 of the participants of the communication session and to generate one or more media streams based on the received media streams. The stream generation unit 320 may be configured to receive the client device media stream(s) 1010a, 1010b, and 1010c and generate the shared media stream(s) 1020 that are transmitted to each of the participants of the communication session as illustrated in FIG. 10. The stream generation unit 320 may also generate one or more audio streams to be transmitted to the transcription services 240. The communications platform 230 may merge the audio received from the client devices 205a, 205b, and 205c into a single audio stream that includes all of the audio from all of the participants in one stream. The communications platform 230 may merge the video content received from the client devices 205a, 205b, and 205c into a single video stream. The video stream may include representation of each of the participants admitted to and participating in the private communication subsession or may include a representation of a participant that is determined to be speaking. The video stream may also include a rendering of a content item that is being shared by a participant of the communication session.

The stream analysis unit 325 is configured to perform image analysis on the pixel data of one or more media streams received from the client devices 205 to identify features of a shared content item. In some implementations, the communications platform application 235 of the communications platform or the communications platform application 245 of a client device 205 of a participant may provide an indication to the communications platform 230 that the participant is screen sharing, which may trigger the stream analysis unit 325 to begin analyzing a media stream received from the computing device of that participant and may also trigger the stream generation unit 320 to generate a media stream to each of the participants that includes the shared content. The user interface 110 may include a button or other user interface element that allows the participant to initiate screen sharing and a button or other user interface element that allows the participant to end screen sharing.

The stream analysis unit 325 may be configured to extract pixel data from the one or more media streams and to identify features of the shared content item in the extracted pixel data. To identify textual elements of a content item, the stream analysis unit 325 may be configured to perform one or more text recognition techniques on the extracted pixel data to identify textual features of the content item. The stream analysis unit 325 may utilize one more optical character recognition (OCR) techniques, one or more optical word recognition techniques, one or more intelligent character recognition (ICR) techniques, and/or one or more intelligent word recognition (IWR) recognition techniques. The stream analysis unit 325 may use one or more machine learning models trained to recognize textual content in an image to extract the textual information from the pixel data. The extracted textual information may include titles, headers, text content, and/or other textual elements of the content item being shared by the participant of the communication session. The stream analysis unit 325 may be configured to generate a mathematical representation of the pixel data representing one or more textual items identified in the pixel data associated with the shared content item. The mathematical representation is also referred to herein as a feature vector and may be provided to one or more machine learning models to identify a content item and/or related content items that have similar features. The identification of shared content items and related content items is discussed in greater detail with respect to the shared content identification unit 335 and the related content identification unit 340.

The stream analysis unit 325 may also be configured to extract image feature information from the pixel data of the content item shared by a participant to the communication session. A content item may include more than just textual content. The content item may include photographs, logos, drawings, renderings, graphs, and/or other non-textual content. The stream analysis unit 325 may be configured to analyze the pixel data and to identify non-textual content included therein. The stream analysis unit 325 may be configured to generate a mathematical representation of the pixel data representing one or more non-textual items identified in the pixel data associated with the shared content item. The mathematical representation is also referred to herein as a feature vector. The mathematical representation may be a vector of numerical values that represent various attributes of the non-textual items included in the pixel data. The representation of the non-textual items may be compared to representations of other content items to identify a source of the non-textual content items. Various techniques may be used to extract image features from the pixel data, such as but not limited to Scale-Invariant Feature Transform (SIFT), Speeded Up Robust Features (SURF), Binary Robust Independent Elementary Features (BRIEF), Oriented FAST and rotated BRIEF (ORB), or DAISY. In some implementations, one or more machine learning models may be used to analyze the features extracted from the media stream to extract feature information.

The user interface unit 330 may be configured to generate a user interface that may be rendered by a web browser or similar application on the client device 205, such as the user interface 110 illustrated in the preceding examples. The user interface 110 permits users to participant in a communication session and/or to access content associated with the communication session. FIGS. 1A-1M include examples of various aspects of the user interface 110. The user interface unit 330 may be configured to generate the user interface 110 in implementations for the communications platform application 235 in implementations where the communications platform 230 provides a cloud-based application for participants to participant in a communications session and/or to access content associated with a communications session. In such implementations, the user interface unit 330 may generate a web page or other content that may be rendered by a web browser or other application on the client device 205. In other implementations, the client device 205 may include a communications platform application 245 and the user interface 110 may be generated on the client device 205 as will be discussed with respect to FIG. 4.

The shared content identification unit 335 may be configured to identify a file associated with a content item that was shared by a participant of the communication session based on the features of the content item determined by the stream analysis unit 325. The shared content identification unit 235 may be configured to access files in one or more storage locations to determine whether a file stored in the one or more storage locations correlates with a content item that was shared by a participant of the communication session. In some implementations, the shared content identification unit 235 may have access to storage locations at the content storage services 240 that are associated with the participant sharing the content, storage locations associated with other participants to the communication session, storage locations associated with a group, team, or organization with which the participant is associated, storage locations associated with the communication session, or a combination of two or more of these storage locations.

The shared content identification unit 335 is configured to correlate the identified features of a shared content item with content items stored in one or more of the locations discussed above. The content items may be associated with one or more of the participants of the communication session, the communication session, or both. The shared content identification unit 335 may be configured to calculate a correlation score for the shared content item and each of the content items found in the one or more locations discussed above. The correlation score may provide a mathematical representation of how similar the shared content item is with a particular content item found in one of the storage locations accessible to the communications platform 230.

The shared content identification unit 335 may be configured to determine a correlation score between a shared content item and a candidate content item accessible by the shared content identification unit 335. In some implementations, the correlation score may be higher for a candidate item that includes features that more closely match the shared content item. In other implementations, the correlation score may represent a "distance" between the candidate content item and the shared content item, and a lower correlation score represents a closer match between the candidate content item and the shared content item.

Figure 11:
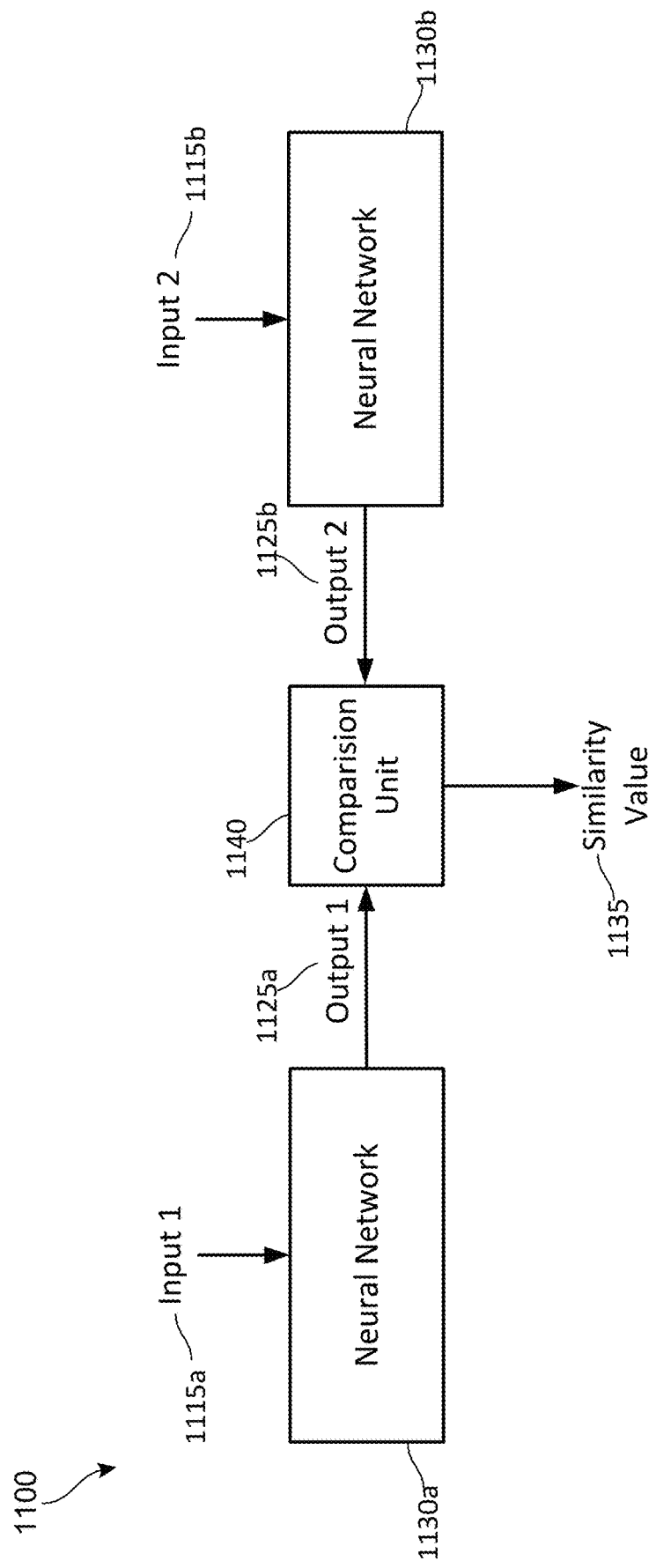
FIG. 11 shows an example Siamese Neural Network (SNN) that may be used by shared content identification unit of the communications platform for identifying shared and/ or related content items.

In some implementations, the shared content identification unit 335 may utilize a Siamese Neural Network (SNN) to identify share content items. An SNN is a class of neural networks that includes two identical subnetworks, which have the same configuration and the same parameters and weights. FIG. 11 illustrates an example SNN 1100 that includes subnetwork 1130a and subnetwork 1130b. The subnetwork 1130a can operate on a first input 1115a and the subnetwork 1130b can operate on a second input 1115b. The first input 1115a may be the shared content item and the second input 1115b may be a candidate content item that is stored in one of the storage locations stored above. The subnetworks 1130a and 1130b are configured to receive numerical vectors as inputs. The textual content of the first inputs 1115a and the second input 1115b can be converted from text to a vectorized representation using word embedding information trained using textual historical data associated with a domain for which the training data is to be assessed by the SNN 1100. Word embedding will be discussed in greater detail in the examples that follow.

The subnetworks 130a and 130b may be implemented as various types of neural networks. For example, the subnetworks 130a and 130b may be implemented as a Bidirectional Long Short-Term Memory (BiLSTM) neural network or other type of neural networks. The only constraints on the subnetworks 1130a and 1130b is that the subnetworks 1130a and 1130b must share the same network architecture and configuration so that they will output the same values if provided with the same input. Other types of sequential neural networks may be used to implement the neural networks of the SNN, such as but not limited to a convolutional neural network (CNN) or a Recurrent Neural Network (RNN).

The subnetwork 130a outputs a first output 1125a based on the first input 1115a, and the subnetwork 1130b outputs a second output 1125b based on the second input 1115b. The first input 1115a may be a shared content item to be identified and the second input 1115b may be a candidate content item to be considered as a possible match for the shared content item. As discussed above, the stream analysis unit 325 may be configured to analyze the content item to generate a mathematical representation of the features of the shared content item also referred to herein as a feature vector. The shared content identification unit 335 may be configured to identify candidate content items located one or more of the storage locations discussed above, and to generate a feature vector for each of those content items using the same techniques used by the steam analysis unit 325 to generate the feature vector for the shared content item. Various techniques may be used to extract image features from the pixel data, such as but not limited to Scale-Invariant Feature Transform (SIFT), Speeded Up Robust Features (SURF), Binary Robust Independent Elementary Features (BRIEF), Oriented FAST and rotated BRIEF (ORB), or DAISY. Various techniques may be used to extract text features from the pixel data, such as but not limited to one more optical character recognition (OCR) techniques, one or more optical word recognition techniques, one or more intelligent character recognition (ICR) techniques, and/or one or more intelligent word recognition (IWR) recognition techniques.

The subnetwork 1130a outputs a first output 1125a, and the subnetwork 1130b outputs a second output 1125b. The outputs may comprise an output vector that includes numerical values representing various aspects of the output. The first output 1125a and the second output 1125b are provided as inputs to the comparator unit 1140. The comparator unit 1140 is configured to calculate a "distance" between the first output 1125a and the second output 1125b and to output this distance as the similarity value 1135 (also referred to herein as a "correlation score"). The SNN 1100 yields a small distance for similar inputs and a greater distance for inputs that are dissimilar. For example, if the candidate content item and the shared content item are closely matched, the distance between the two inputs should be relatively small. The SNN 1100 outputs this distance as the similarity value 1145. The similarity value is a numerical value representing the distance between the first output 1125a and the second output 1125b.

The comparator 140 may be configured to determine the distance between the first output 125a and the second output 125b using various techniques that provide a numerical representation of the difference. In some implementation, the comparator unit 140 may be configured to determine and output as the similarity value 135 as a cosine difference between the vector values of first output 125a and the vector values of the second output 125b.

The shared content identification unit 335 may sort the candidate content items based on the correlation score associated with each of the candidate content items. The shared content identification unit 235 may select a candidate content item that is a correlation score that indicates a closest match to the shared content item. The shared content identification unit 335 may repeat the process of correlating candidate content items for each of the content items that were shared during the communication session.

The shared content identification unit 335 may provide a list of the selected candidate items to the user interface unit 330 to generate the upload shared content interface 140 illustrated in FIG. 1G. The shared content identification unit 335 may receive a list of the selected content items to be uploaded to the communications platform 230 and associated with the communication session from the user interface unit 330 in response to the user activating the upload content button on the upload shared content interface 140. The shared content identification unit 335 may copy the each of the content items to a memory location accessible to the participants of the communication session. The memory location may be on the communications platform 230 or may be on a server of the content storage services 240. The shared content identification unit 335 may also update the meeting summary information 910 associated with the communication session to include the location of the file or files that have been uploaded.

The related content identification unit 340 may be configured to identify one or more content items that may be related to the subject matter of the communication session. The related content identification unit 340 may be configured to obtain feature data associated with one or more content items shared during the communication session from the stream analysis unit 325. The related content identification unit 340 may also be configured to analyze the transcript 125 of the communication session to identify subject matter that may be relevant to the communication session 125. The related content identification unit 340 may be configured to access the various storage locations discussed above to identify content items that may be related to a shared content item. The related content identification unit 340 may utilize techniques similar to those discussed above with respect to the shared content identification unit 335 to compare a shared content item with one or more candidate content items. However, rather than selecting a candidate content item that is a match for the shared content item, the related content identification unit 340 may rank the candidate content items by their respective correlation scores and select one or more candidate content items that do not have the highest correlation score but instead select one or more candidate content items that have a second highest, third highest, or fourth highest correlation score. These candidate documents were not a match for the shared content item but shared enough characteristics with the shared content item that they may be of interest to participants of the communication session. The number of candidate content items that may be selected may be configurable and may vary from implementation to implementation.

The related content identification unit 340 may also be configured to execute a search query on publicly available databases and/or the Internet to identify candidate content items that may be related to the subject matter of the communication session. The related content identification unit 340 may identify subject matter-related words and/or phrases in the transcript 125 and/or in the shared content to use as terms for constructing a search query. The related content identification unit 340 may execute one or more search queries that return candidate documents to be associated with the communication session. The related content identification unit 340 may provide a list of the candidate items to the user interface unit 330 to generate the upload related content interface 145 illustrated in FIG. 1H. The related content identification unit 340 may receive a list of the selected content items to be uploaded to the communications platform 230 and associated with the communication session from the user interface unit 330 in response to the user activating the upload content button on the upload related content interface 145. The related content identification unit 340 may copy the each of the content items to a memory location accessible to the participants of the communication session. The memory location may be on the communications platform 230 or may be on a server of the content storage services 240. The related content identification unit 340 may also update the meeting summary information 910 associated with the communication session to include the location of the file or files that have been uploaded.

The operating parameter configuration unit 345 may be configured to provide an interface that allows a user to configure at least some of the operating parameters of a communication session hosted by the communications platform 230. These operating parameters may include quality of service requirements for the meeting, such as audio quality and/or video quality requirements. The operating parameters may also indicate whether a participant permits the communications platform to automatically upload shared content identified by the shared content identification unit 335 and/or related content identified by the related content identification unit 340. The operating parameter configuration unit 345 may also provide an interface that allows participants to configure other aspects of the communication session, such as whether the transcript may be generated in real-time or after the communication session is completed, whether the transcript may be updated to include shared content items, whether the shared content items may be updated to include excerpts of the transcript, and/or other operating parameters related to the communication session.

Figure 4:
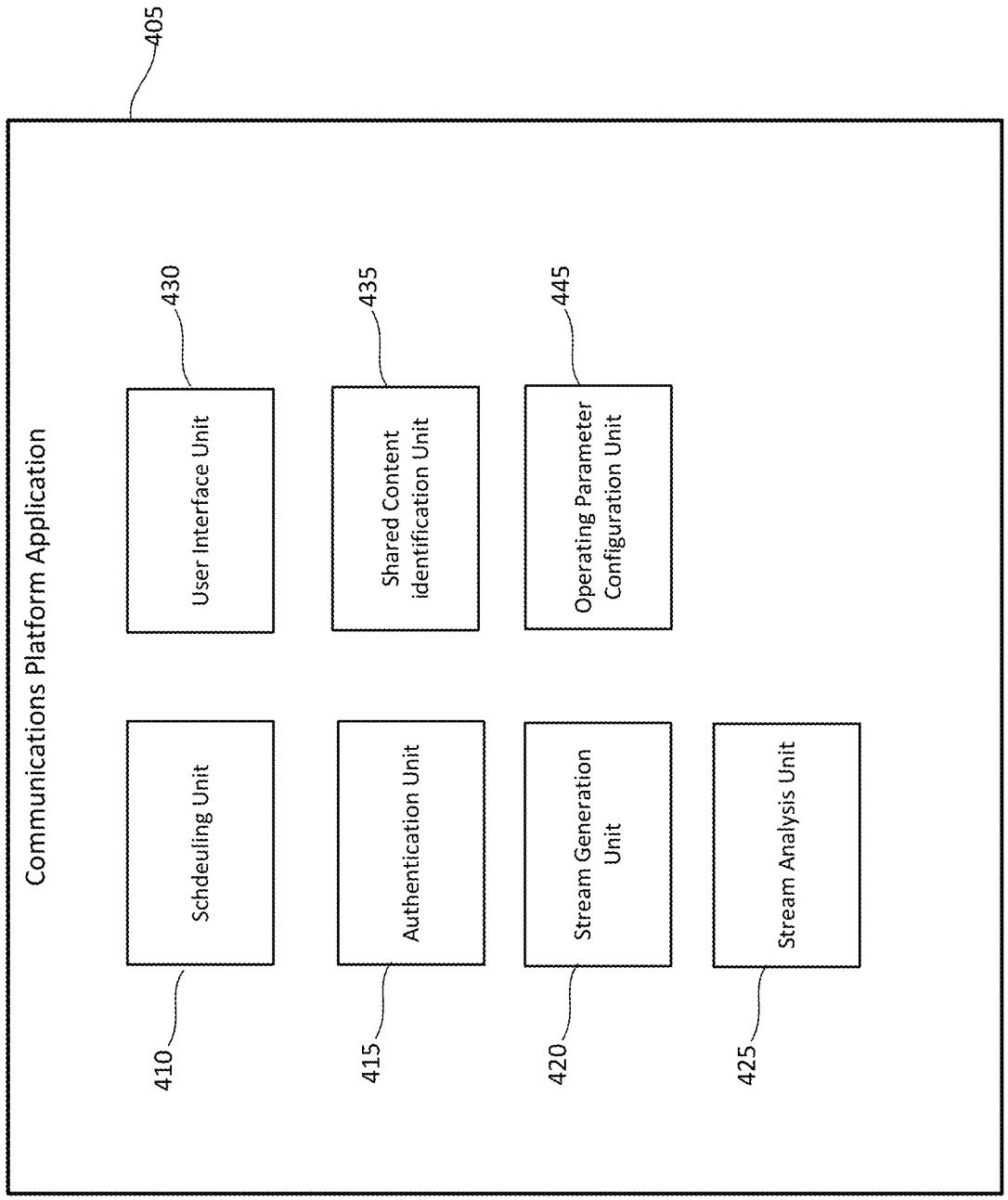
FIG. 4 is a block diagram of an example communication session management application which may be implemented on the client device shown in FIG. 2.

FIG. 4 is a block diagram of an example communications platform application 405 which may be implemented on a client device 205. The communications platform application 405 may include a scheduling unit 410, an authentication unit 415, a stream generation unit 420, a user interface unit 430, a stream analysis unit 425, a shared content identification unit 435, and an operating parameter configuration unit 445. The communications platform application 405 can be implemented by processor-executable program code, hardware, or a combination thereof, and may be implemented by the example software architecture 600 of FIG. 6 and/or the example computing device 700 illustrated in FIG. 7.

The scheduling unit 410 of the communications platform application 405 may be configured to add a communication session to a calendar of a participant in response to the participant accepting an invitation to participant in a communication session. The invitation may be sent to the participant from the communications platform 230 via The authentication unit 415 may be configured to render, via the user interface unit 430, an interface that prompts the user to provide authentication credentials. The authentication unit 415 may request authentication credentials for the participant, such as a username and password, to authenticate the user. Such a configuration may be used by a corporation or other entity to ensure that a third party that is not authorized to participate in the communication session has not obtained an invitation to the communication session. The authentication unit 415 may also support other authentication techniques, such as but not limited to federated authentication, for determining the identity of a participant. In some implementations, the authentication unit 415 may be configured to authenticate the user at the client device 205 and send an indication to the communications platform 230 that the user should be permitted to participant in a communication session and/or to access content associated with a communication session. In other implementations, the authentication unit 415 may provide the authentication credentials or information derived therefrom to the communications platform 230 to authentication the user. The communications platform 230 may provide an indication to the user whether the authentication was successful.

The stream generation unit 420 may be configured to receive audio data from one or more microphones associated with the client device 205, to receive image(s) and/or video content from one or more video cameras, or a combination thereof, and to generate one or more media streams for transmission to the communications platform 230. The stream generation unit 420 may also generate a media stream comprising image(s) and/or video to support screen sharing. The image(s) and/or video may include a least a portion of the desktop rendered on the client device 205 or an application window associated with an application from which the participant would like to share content. The user interface 110 of the communications platform application 405 may include controls that allow the participant to begin screen sharing and to select what content is to be shared, such as a view of the desktop of the client device 205 or an application window for an application being executed on the client device 205.

The stream analysis unit 425 may be configured to operation similarly to the stream analysis unit 325 of the communications platform 305. The stream analysis unit 425 may analyze the content of one or more media streams generated by the stream generation unit 420 to identify features of shared content items by analyzing the pixel data from the one or more media streams. The stream analysis unit 425 may use various OCR and image feature extraction techniques to analyze the pixel data.

The user interface unit 430 may be configured to generate a user interface that may be rendered on a display of the client device 205. The user interface unit 430 may be configured to generate a user interface 110 the permits users to participant in a communication session and/or to access content associated with the communication session from their client device 205. FIGS. 1A-1M are examples of user interfaces that may be implemented by the user interface unit 340. The user interface unit 430 may be configured to render other user interfaces instead of or in addition to one or more of the examples of user interface 110 illustrated in FIGS. 1A-1M.

The shared content identification unit 435 may be configured to operate similarly to the shared content identification unit 335 of the communications platform 305 except that the shared content identification unit 435 may be configured to determine whether a content item shared by a participant is located in a local memory of the client device 205. The shared content identification unit 435 receive an indication from the shared content identification unit 435 of the communications platform 230 if the communications platform 230 is unable to locate a file associated with a shared content item. The shared content identification unit 435 may then attempt to identify the location of the shared content item on the client device 205 responsive to receiving the indication from the communications platform 230. The shared content identification unit 435 may provide a list of the selected candidate items to the user interface unit 430 to generate the upload shared content interface 140 illustrated in FIG. 1G. The shared content identification unit 435 of the client device 205 may receive a list of the selected content items to be uploaded to the communications platform 230 and associated with the communication session from the user interface unit 430 in response to the user activating the upload content button on the upload shared content interface 140. The shared content identification unit 435 may transmit a copy the each of the content items to the communications platform 230 which may store the copy in a memory location accessible to the participants of the communication session. The memory location may be on the communications platform 230 or may be on a server of the content storage services 240. The communications platform 230 may also update the meeting summary information 910 associated with the communication session to include the location of the file or files that have been received from the shared content identification unit 435.

The shared content identification unit 435 may be configured to attempt to identify a shared content item by attempting to determine which applications that the participant has active on the client device 205 while the participant is screen sharing. The shared content identification unit 435 analyzes the pixel data associated with the shared content to identify features of the shared content item as in the preceding examples but may also request, from the operating system of the client device 205, information identifying which applications are currently running on the client device 205. The shared content identification unit 435 may be configured to identify applications that may be associated with a content item that may be shared, such as a but not limited to a document viewer or editor, a slide show or presentation viewer or editor, an image viewer or editor, a video viewer or editor, and/or other types of applications that may be used to edit and/or view a content item that may be shared by a participant to the communication session. The shared content identification unit 435 may be configured to contact the communications platform 230 and/or another online resource, such as but not limited to a search engine, to determine what type of application is being executed by the client device 205 if the shared content identification unit 435 does not include information for that particular application. The shared content identification unit 435 may eliminate applications that are not associated with editing or viewing one of the various types of content items that may be shared and consider the list of application that may have been used by the participant to share the content item. The shared content identification unit 435 may then conduct a search through persistent storage of the client device 205, such as but not limited to a hard drive and/or solid-state drive of the client device 205. The shared content identification unit 435 may be configured to display the upload shared content interface 140 of FIG. 1G responsive to the shared content identification unit 435 identifying the shared content item or items. The shared content identification unit 435 may be configured to display the upload shared content interface 150 of FIG. 1I responsive to the shared content identification unit 435 being unable to identify the shared content item or items.

The operating parameter configuration unit 445 may be configured to provide an interface that allows a user to configure at least some of the operating parameters of a communication session hosted by the communications platform 230. These operating parameters may include quality of service requirements for the meeting, such as audio quality and/or video quality requirements. The operating parameters may also indicate whether a participant permits the communications platform to automatically upload shared content identified by the shared content identification unit 435 or by the communications platform 230 and/or related content identified by the communications platform 230. The operating parameter configuration unit 445 may also provide an interface that allows participants to configure other aspects of the communication session, such as whether the transcript may be generated in real-time or after the communication session is completed, whether the transcript may be updated to include shared content items, whether the shared content items may be updated to include excerpts of the transcript, and/or other operating parameters related to the communication session. The operating parameter configuration unit 445 may be configured to transmit an indication to the communications platform 230 responsive to the participant changing one or more operating parameters.

Figure 5:
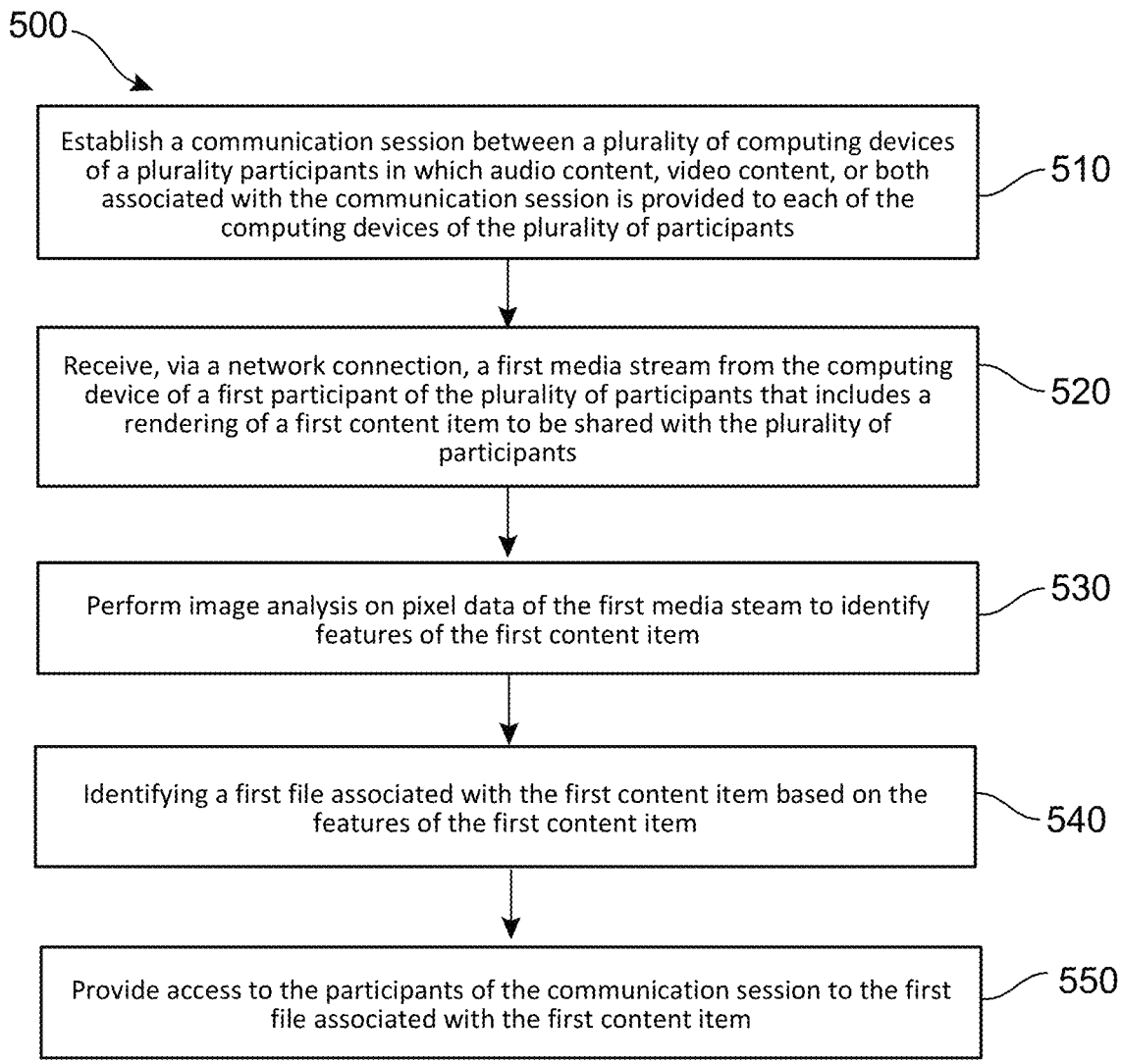
FIG. 5 is a flow chart showing an implementation of an example process executed by a data processing system for conducting a communication session.

FIG. 5 is a flow chart illustrating an implementation of an example process 500 executed by a data processing system for conducting a communication session. The process 500 may be implemented by the communications platform 230, the communication session management unit 305, and/or the computing device 700. The process 500 includes identifying shared content and/or related content for a communication session and providing access to the shared content and/or related content to the participants of the communication session. The shared content may be shared by a participant of the communication session that is screen sharing. Screen sharing in this context indicates that the client device 205 of the participant is providing image(s) and/or video that includes a rendering of the desktop of the client device 205 and content displayed thereon or an application window associated with an application being executed on the client device 205.

The process 500 may include an operation 510 of establishing a communication session between a plurality of computing devices of a plurality participants in which media content associated with the communication session is provided to each of the computing devices of the plurality of participants. As illustrated in FIG. 10, each client device 205 may transmit one or more client device media streams 1010 to the communications platform 230, and the communications platform 230 may generate one or more shared media streams 1020 from the client device media streams 1010 and transmit the one or more shared media streams 1020 to each of the client devices 205.

The process 500 may include an operation 520 of receiving, via a network connection, a first media stream from the computing device of a first participant of the plurality of participants that includes a rendering of a first content item to be shared with the plurality of participants. As discussed in the preceding examples, a participant to the communication session may share a content item via screen sharing. The client device 205 of that participant may generate a media stream in included in the client device media streams 1010 in which a rendering of the shared content item is included. The rendering may be an image, series of images, or a video of the content item.

The process 500 may include an operation 530 of performing image analysis on pixel data of the first media steam to identify features of the first content item. The pixel data of the first media stream can be analyzed to identify textual and non-textual features of the content item as discussed in the preceding examples.

The process 500 may include an operation 540 of identifying a first file associated with the first content item based on the features of the first content item. As discussed in the preceding examples, the communications platform 230 may identify a file associated with the shared content item using various techniques, including but not limited to correlating textual and/or non-textual features of the shared content item with the first content item to determine which file represents the shared content item and where that file is stored. The communications platform 230 may determine a correlation score between the shared content item and a plurality of candidate content items that are stored in various memory locations accessible to the communications platform 230 as discussed above. The communications platform 230 may determine that one of the candidate content items matches the shared content item by ranking the candidate content items by their correlation score and by selecting a candidate content item that most closely matches the shared content item based on the correlation score for that candidate content item.

The process 500 may include an operation 550 of providing access to the participants of the communication session to the first file associated with the first content item. The communications platform 230 may access the file associated with the shared content item and store a copy of the file associated with first content item in a memory that is accessible to participants of the communication session. The communications platform 230 may provide a link to the file and may add the link to the meeting summary 120 of the user interface 120 of the communications platform application so that participants may access the content item. The communications platform 230 may also transmit a copy of the content item to the computing device 205 of the participants of the communication session via email, text message, or through other means for distributing a copy of the file of the shared content item to the participants of the communication session.

The process 500 may include additional optional operations associated with identifying related content. Such additional operations may include correlating the identified features of the first content item with a second plurality of content items accessible via a public or private network connection, identifying one or more second content items of the plurality of second documents based on the correlation score associated with the first content item, and storing a copy of or a link to each of the one or more second content items in a memory of the data processing system accessible to the plurality of participants.

The process 500 may also include additional optional operations associated with correlating the transcript 125 with the content items. Such additional operations may include determining a first time at which a first portion of the document was displayed in the first media stream, accessing a transcript of the communication session, the transcript providing a time-encoded textual representation of spoken content of the communication session, and correlating a first portion of the first content item with a first portion of the transcript based on the first time that the first portion of the first content item was displayed in the first media stream. The process 500 may also include additional operations related to adding excerpts of the transcript 125 to the shared content item, excerpts of the shared content item to the transcript 125, or both. Such additional operations may include inserting at least the first portion of the first content item into the first portion of the transcript, inserting at least the first portion of the transcript into the first portion of the first content item, or both.

The process 500 may include additional operations of transmitting a copy of the shared content item to the participants of the communication session. Such additional operations may include sending, over the network connection, a copy of the first content item or a link to the copy of the first content item to the plurality of participants of the communication session.

The process 500 may include additional operations that may be performed in the event that the file associated with the first content item cannot be located. Such additional operations may include determining that the first content item cannot be identified, cannot be located, or both, extracting an image of a first portion of the first content item from the first media stream, and storing the image in a memory associated with the communication session accessible to the plurality of participants.

The detailed examples of systems, devices, and techniques described in connection with FIGS. 1A-5 and 8-11, are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, displaying an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1A-5 and 8-11 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules may provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 6:
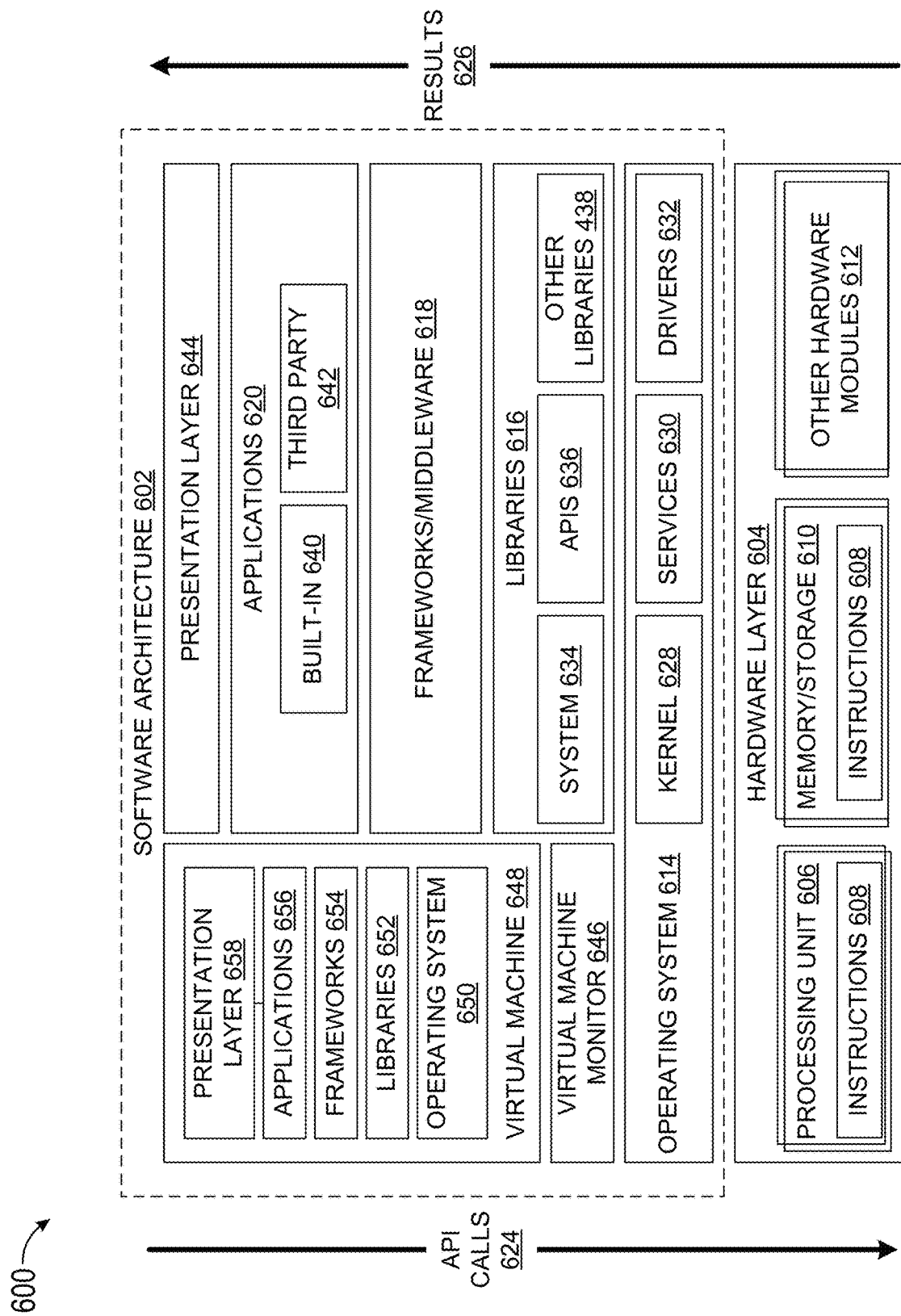
FIG. 6 is a block diagram showing an example software architecture, various portions of which may be used in conjunction with various hardware architectures herein described, which may implement any of the features herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture and it will be appreciated that many other architectures may be implemented to facilitate the functionality described herein. The software architecture 602 may execute on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 includes a processing unit 606 and associated executable instructions 608. The executable instructions 608 represent executable instructions of the software architecture 602, including implementation of the methods, modules and so forth described herein. The hardware layer 604 also includes a memory/storage 610, which also includes the executable instructions 608 and accompanying data. The hardware layer 604 may also include other hardware modules 612. Instructions 608 held by processing unit 608 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular platform. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 614, libraries 672, frameworks 654, applications 656, and/or a presentation layer 658.

Figure 7:
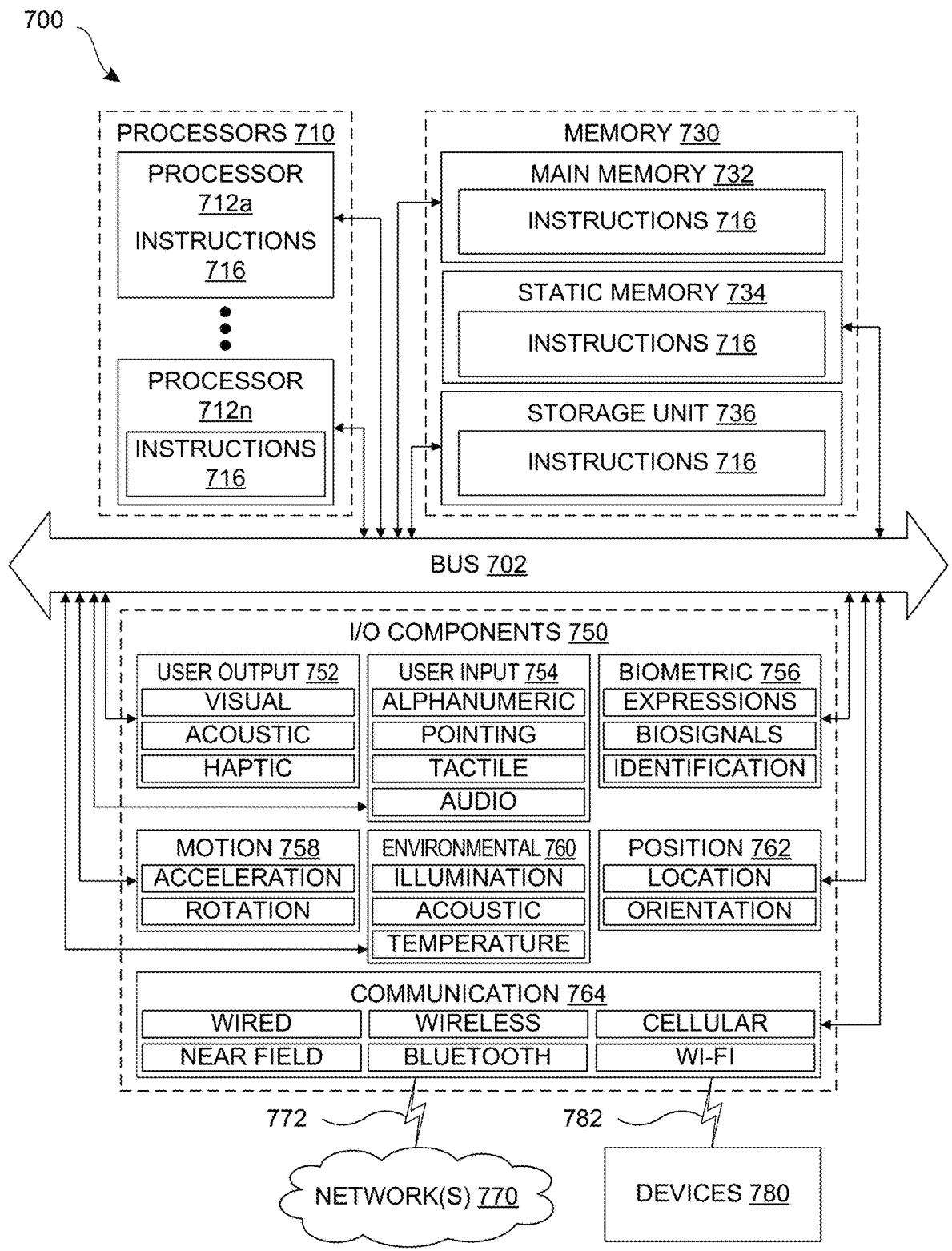
FIG. 7 is a block diagram showing components of an example machine configured to read instructions from a machine-readable medium and perform any of the features described herein.

FIG. 7 is a block diagram showing components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement modules or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760, and/or position components 762, among a wide array of other physical sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 758 may include, for example, acceleration sensors (for example, an accelerometer) and rotation sensors (for example, a gyroscope). The environmental components 760 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 762 may include, for example, location sensors (for example, a Global Position System (GPS)

receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:
1. A data processing system comprising:
    a processor; and
    a computer-readable medium in communication with the processor and storing executable instructions that, when executed by the processor, cause the processor to control the data processing system to perform:
        establishing a communication session between a plurality of computing devices of a plurality participants in which media content associated with the communication session is provided to each of the computing devices of the plurality of participants;
        receiving, via a network connection, a first media stream from the computing device of a first participant of the plurality of participants, the first media stream including a rendering of a first content item to be shared with the plurality of participants;

performing image analysis on pixel data of the first media stream to identify features of the first content item included in the first media stream;

comparing the identified features of the first content item with a first file associated with the first content item;

determining, based on the comparison between the identified features of the first content item and the first file, that the identified features of the first content item are part of the first file; and providing to the participants of the communication session access to the first file associated with the first content item.

2. The data processing system of claim 1, wherein the executable instructions, when executed by the processor, further cause the processor to control the data processing system to perform:

identifying a first storage location of the first file associated with the first content item based on the identified features from the rendering of the first content item;

accessing the first file associated with the first content item at the identified first storage location; and storing the accessed first file associated with the first content item in a second storage location accessible to the plurality of participants.

3. The data processing system of claim 2, wherein, for identifying the first storage location of the first content item, the executable instructions, when executed by the processor, further cause the processor to control the data processing system to perform:

correlating the identified features of the first content item with a first plurality of content items associated with one or more of the plurality of participants, the communication session, or both to produce a correlation score for each of the plurality of content items; and identifying the first content item in the plurality of first content items based on the correlation score associated with the first content item.

4. The data processing system of claim 3, wherein the executable instructions, when executed by the processor, further cause the processor to control the data processing system to perform accessing the first plurality of content items in a server-based storage associated with the one or more of the plurality of participants, the communication session, or both.

5. The data processing system of claim 1, wherein the executable instructions, when executed by the processor, further cause the processor to control the data processing system to perform:

correlating the identified features of the first content item with a second plurality of content items accessible via a public or private network connection;

identifying one or more second content items of the second plurality of content items based on a correlation score associated with the first content item; and storing a copy of or a link to each of the one or more second content items in a memory of the data processing system accessible to the plurality of participants.

6. The data processing system of claim 1, wherein the executable instructions, when executed by the processor, further cause the processor to control the data processing system to perform:

determining a first time at which a first portion of the first file was displayed in the first media stream;

accessing a transcript of the communication session, the transcript providing a time-encoded textual representation of spoken content of the communication session; and correlating a first portion of the first content item with a first portion of the transcript based on the first time that the first portion of the first content item was displayed in the first media stream.

7. The data processing system of claim 6, wherein the executable instructions, when executed by the processor, further cause the processor to control the data processing system to perform inserting at least the first portion of the first content item into the first portion of the transcript.

8. The data processing system of claim 6, wherein the executable instructions, when executed by the processor, further cause the processor to control the data processing system to perform inserting at least the first portion of the transcript into the first portion of the first content item.

9. The data processing system of claim 1, wherein, for providing access to the first file associated with the first content item, the executable instructions, when executed by the processor, further cause the processor to control the data processing system to perform sending, over the network connection, a copy of the first content item or a link to the copy of the first content item to the plurality of participants of the communication session.

10. The data processing system of claim 1, wherein the executable instructions, when executed by the processor, further cause the processor to control the data processing system to perform:

receiving an indication from a user device of the first participant that the first content item is stored locally on the user device; and prompt the user to upload the first content item responsive to receiving the indication from the user device that the first content item is stored locally on the user device.

11. The data processing system of claim 1, wherein the executable instructions, when executed by the processor, further cause the processor to control the data processing system to perform:

determining that the first content item cannot be identified, cannot be located, or both;

extracting an image of a first portion of the first content item from the first media stream; and storing the image in a memory associated with the communication session accessible to the plurality of participants.

12. A method of operating a data processing system for conducting a communication session between a plurality of computing devices of a plurality participants, the method comprising:

establishing a communication session between a plurality of computing devices of a plurality participants in which media content associated with the communication session is provided to each of the computing devices of the plurality of participants;

receiving, via a network connection, a first media stream from the computing device of a first participant of the plurality of participants, the first media stream including a rendering of a first content item to be shared with the plurality of participants;

performing image analysis on pixel data of the first media stream to identify features of the first content item included in the first media stream;

comparing the identified features of the first content item with a first file associated with the first content item;

determining, based on the comparison between the identified features of the first content item and the first file, that the identified features of the first content item are part of the first file; and providing to the participants of the communication session access to the first file associated with the first content item.

13. The method of claim 12, further comprising:

identifying a first storage location of the first file associated with the first content item based on the identified features of the first content item;

accessing the first file associated with the first content item at the identified first storage location; and storing the accessed first file associated with the first content item in a second storage location accessible to the plurality of participants.

14. The method of claim 13, wherein identifying the first storage location of the first content item further comprises:

correlating the identified features of the first content item with a first plurality of content items associated with one or more of the plurality of participants, the communication session, or both to produce a correlation score for each of the plurality of content items; and identifying the first content item in the plurality of first content items based on the correlation score associated with the first content item.

15. The method of claim 14, further comprising:

accessing the first plurality of content items in a server-based storage associated with the one or more of the plurality of participants, the communication session, or both.

16. The method of claim 12, further comprising:

determining a first time at which a first portion of the first file was displayed in the first media stream;

accessing a transcript of the communication session, the transcript providing a time-encoded textual representation of spoken content of the communication session;

correlating a first portion of the first content item with a first portion of the transcript based on the first time that the first portion of the first content item was displayed in the first media stream; and inserting at least the first portion of the first content item into the first portion of the transcript, inserting at least the first portion of the transcript into the first portion of the first content item, or both.

17. A non-transitory computer-readable medium comprising executable instructions that, when executed by a processor, cause the processor to control a data processing system to perform:

establishing a communication session between a plurality of computing devices of a plurality participants in which media content associated with the communication session is provided to each of the computing devices of the plurality of participants;

receiving, via a network connection, a first media stream from the computing device of a first participant of the plurality of participants, the first media stream including a rendering of a first content item to be shared with the plurality of participants;

performing image analysis on pixel data of the first media stream to identify features from the rendering of the first content item;

comparing the identified features of the first content item with a first file associated with the first content item;

determining, based on the comparison between the identified features of the first content item and the first file, that the identified features of the first content item are part of the first file; and providing to the participants of the communication session access to the first file associated with the first content item.

18. The computer-readable medium of claim 17, wherein the executable instructions, when executed by the processor, further cause the processor to control the data processing system to perform:

identifying a first storage location of the first file associated with the first content item based on the identified features of the first content item;

accessing the first file associated with the first content item at the identified first storage location; and storing the accessed first file associated with the first content item in a second storage location accessible to the plurality of participants.

19. The computer-readable medium of claim 17, wherein, for identify the first storage location of the first content item, the executable instructions, when executed by the processor, further cause the processor to control the data processing system to perform:

correlating the identified features of the first content item with a first plurality of content items associated with one or more of the plurality of participants, the communication session, or both to produce a correlation score for each of the plurality of content items; and identifying the first content item in the plurality of first content items based on the correlation score associated with the first content item.

20. The computer-readable medium of claim 19, wherein the executable instructions, when executed by the processor, further cause the processor to control the data processing system to perform accessing the first plurality of content items in a server-based storage associated with the one or more of the plurality of participants, the communication session, or both.

* * * * *